(12) United States Patent
Zollinger et al.

(10) Patent No.: US 12,318,258 B2
(45) Date of Patent: Jun. 3, 2025

(54) DENTAL DRILL GUIDING SYSTEM

(71) Applicant: STRAUMANN HOLDING AG, Basel (CH)

(72) Inventors: Simon Zollinger, Basel (CH); Sven Schneider, Basel (CH); Alain Hedinger, Basel (CH); Tobias Brechbuehl, Basel (CH)

(73) Assignee: STRAUMANN HOLDING AG, Basel (CH)

( * ) Notice: Subject to any disclaimer, the term of this patent is extended or adjusted under 35 U.S.C. 154(b) by 316 days.

(21) Appl. No.: 17/437,169

(22) PCT Filed: Mar. 6, 2020

(86) PCT No.: PCT/EP2020/056030
§ 371 (c)(1),
(2) Date: Sep. 8, 2021

(87) PCT Pub. No.: WO2020/182663
PCT Pub. Date: Sep. 17, 2020

(65) Prior Publication Data
US 2022/0168066 A1    Jun. 2, 2022

(30) Foreign Application Priority Data

Mar. 8, 2019 (EP) ..................... 19161715

(51) Int. Cl.
*A61C 1/08* (2006.01)
(52) U.S. Cl.
CPC .................... *A61C 1/084* (2013.01)
(58) Field of Classification Search
CPC .......... A61C 1/082; A61C 1/084; A61C 1/095
See application file for complete search history.

(56) References Cited

U.S. PATENT DOCUMENTS 5,782,918 A * 7/1998 Klardie ................ A61C 8/0069
433/172
5,906,488 A * 5/1999 Kvarnstrom ......... A61C 8/0089
433/116

(Continued)

FOREIGN PATENT DOCUMENTS

DE    20 2011 004 222 U1    6/2012
DE    10 2012 204 462 A1    9/2012

(Continued)

OTHER PUBLICATIONS

Aug. 6, 2019 Extended European Search Report issued in European Patent Application No. 19161715.8.

(Continued)

*Primary Examiner* — Nicholas D Lucchesi
*Assistant Examiner* — Hao D Mai
(74) *Attorney, Agent, or Firm* — Oliff PLC

(57) ABSTRACT

A dental drill guiding system includes a drill guide including a hollow tube having an exterior surface and a guide sleeve including an internal surface defining a through bore configured to receive the hollow tube of the drill guide. The exterior surface of the hollow tube and guide sleeve's internal surface have complementary anti-rotation sections. The drill guide's hollow tube further includes at least one radially extending protrusion limited in the axial extent and formed by an increase in radius of the hollow tube in the apical direction and dimensioned for accommodation in at least one undercut of the guide sleeve, such that when at least one protrusion of the hollow tube is housed in at least one undercut of the guide sleeve the hollow tube is axially retained within the guide sleeve such that removal of the drill guide from the guide sleeve in the coronal direction is prevented.

21 Claims, 10 Drawing Sheets

(56) References Cited

U.S. PATENT DOCUMENTS

| | | | |
|---|---|---|---|
| 6,012,923 A * | 1/2000 | Bassett | A61C 8/005 |
| | | | 433/172 |
| 6,227,859 B1 * | 5/2001 | Sutter | A61C 8/0066 |
| | | | 433/173 |
| 8,747,112 B2 * | 6/2014 | Brun | A61C 8/0062 |
| | | | 433/173 |
| 9,113,982 B1 | 8/2015 | Jamison | |
| 9,211,165 B2 | 12/2015 | Jamison | |
| 9,987,101 B2 | 6/2018 | Jamison | |
| 2003/0082499 A1 * | 5/2003 | Halldin | A61C 8/0072 |
| | | | 433/172 |
| 2005/0170311 A1 | 8/2005 | Tardieu et al. | |
| 2008/0044794 A1 * | 2/2008 | Brajnovic | A61C 8/0089 |
| | | | 433/172 |
| 2009/0130629 A1 * | 5/2009 | Towse | A61C 8/005 |
| | | | 433/174 |
| 2010/0129768 A1 | 5/2010 | Isidori | |
| 2010/0151411 A1 | 6/2010 | Suter et al. | |
| 2011/0046631 A1 | 2/2011 | Suter et al. | |
| 2011/0082461 A1 | 4/2011 | Suter et al. | |
| 2012/0135373 A1 * | 5/2012 | Cheng | A61C 13/08 |
| | | | 433/213 |
| 2013/0004916 A1 * | 1/2013 | Bellanca | A61C 8/0057 |
| | | | 433/173 |
| 2013/0012945 A1 * | 1/2013 | Chreene | A61B 17/1728 |
| | | | 606/80 |
| 2015/0265373 A1 * | 9/2015 | Jamison | A61C 1/085 |
| | | | 433/173 |
| 2015/0305836 A1 * | 10/2015 | Fischer | A61C 8/0012 |
| | | | 433/173 |
| 2015/0351866 A1 * | 12/2015 | Thompson, Jr. | A61B 34/10 |
| | | | 433/173 |
| 2015/0359479 A1 * | 12/2015 | Crandall | A61B 6/12 |
| | | | 433/29 |
| 2016/0184051 A1 * | 6/2016 | Lantz | A61C 1/084 |
| | | | 433/75 |
| 2016/0310232 A1 | 10/2016 | Jamison | |
| 2017/0043415 A1 * | 2/2017 | Cheney | A61B 17/0642 |
| 2017/0128155 A1 * | 5/2017 | Lin | A61C 1/084 |
| 2018/0206945 A1 * | 7/2018 | Haus | A61C 8/0065 |
| 2018/0250097 A1 | 9/2018 | Jamison | |

FOREIGN PATENT DOCUMENTS

| | | |
|---|---|---|
| DE | 20 2013 001 415 U1 | 3/2013 |
| DE | 20 2013 000 576 U1 | 4/2014 |
| DE | 10 2014 201 150 A1 | 7/2014 |
| EP | 2 163 220 A1 | 3/2010 |
| EP | 2 465 462 A2 | 6/2012 |
| WO | 2007/085719 A1 | 8/2007 |

OTHER PUBLICATIONS

May 18, 2020 International Search Report issued in International Patent Application No. PCT/EP2020/056030.

May 18, 2020 Written Opinion issued in International Patent Application No. PCT/EP2020/056030.

Aug. 25, 2021 International Preliminary Report on Patentability issued in International Patent Application No. PCT/EP2020/056030.

* cited by examiner

DENTAL DRILL GUIDING SYSTEM

This invention relates to a dental drill guide for use together with a dental surgical template in dental implant surgery, and to a guide sleeve configured to be mounted in or integrally formed with a dental surgical template, and a combination thereof.

BACKGROUND

Dental implants are used to replace individual teeth or for anchoring more complex structures, which generally replace several or even all of the teeth. The implants are inserted into the jaw bone, where they osseointegrate with the bone to provide a firm anchor for the prosthesis.

A critical step in dental implant surgery is the drilling of a hole at the location in the patient's jaw bone where the dental implant (also called dental fixture) is to be inserted and anchored. The width, length and axial direction of the hole are crucial to provide proper positioning and osseointegration of the implant. To facilitate correct placement of the implant and thereby achieve a prosthetically optimized implant axis, so-called guided surgery is often used. An exemplary guided surgery system is disclosed in US 2005/0170311 A1.

In guided surgery, an individualized dental surgical template (also called drill jig) corresponding to the patient's teeth and/or jaw bone is formed. Dental surgical templates are used for guiding dental implant drills in the preparation of the jaw bone and are intended to be used for placement of one or more dental implants. The template thus serves to ensure that the drilling is carried out precisely in accordance with the optimal implant axes that have been determined at the planning stage. Dental surgical templates of this kind are modelled manually or manufactured with the aid of a computer (CAM) and are generally made of a thermoplastic polymeric material. The dental surgical templates may be formed by moulding, milling or 3D printing technology. Holes are provided within the template corresponding to the chosen location and orientation of the implants to be anchored. These holes serve to guide a dental implant drill during a surgical intervention to ensure that the bore holes are correctly positioned for each implant. Currently, standardised metal guide sleeves (hereinafter called standard guide sleeves) are usually incorporated into the template to increase the precision of the drilling operations. The sleeves are positioned in the template holes such that, during a surgical intervention, the dental implant drill is guided by the sleeve. With advances in 3D printing technology however, such standard guide sleeves are not always required as the surgical template can be 3D-printed directly with appropriate holes.

In most implantation methods, the drilling is carried out in several steps. For example, a first drilling step is carried out with a pilot drill of small diameter, followed by a drilling step using a twist drill having the final diameter of the implant that is to be inserted. Depending on the method used, other drills with intermediate diameters or other cutting geometries may also be needed. To apply this method, suitable drill guides are fitted into the hole, or into a standard guide sleeve mounted in such hole, of the dental surgical template.

The drill guides comprise a hollow tube having an external diameter corresponding to the internal diameter of the hole or guide sleeve of the template and thus allows insertion of the tube into the hole or guide sleeve. The internal diameter of the hollow tube corresponds to the external diameter of one of the drills which will be used during surgery. This allows insertion of the drill into the hollow tube and precise guidance of the drill during the drilling procedure. In this way, different drill guides can be used to narrow the hole in the template, or the central opening of a standard guide sleeve mounted in such hole, to fit each of the drills which are used during the surgical procedure.

The drill guides need to be exchanged during the surgery and the hollow tubes are small, typically with diameters of less than 6 mm. This results in handling difficulties and even the risk of aspiration by the patient.

Therefore, the drill guide generally comprises a handle which the practitioner can hold to position the hollow tube within a template hole, or a standard guide sleeve mounted in such hole.

US 2011/082461 A1 discloses a drill guide comprising a handle and at least two hollow tubes protruding from the underside of the handle. The at least two hollow tubes may be arranged at each end of the handle and may have different internal diameters. The external diameter of the hollow tubes should match the diameter of the drill holes in the drill jig or the internal diameter of a standardized metal guide sleeve incorporated in the drill jig.

During the drilling procedure, the dental drill should not penetrate too deeply in the bone in order to prevent nerve damage. In guided surgery, the template and drill guides can be used to limit the depth to which the drill can be inserted, thus preventing over penetration.

US 2011/046631 A1 discloses a drill guide comprising a handle and at least two hollow tubes protruding from the underside of the handle. The drill guide may comprise two limit stops, where each limit stop is an axial continuation of one of the hollow tubes, and the limit stops may have different heights in the axial direction. The internal diameter of the at least two hollow tubes may be identical or different. The limit stop serves as a stop surface for the drilling tool thereby ensuring that the practitioner does not drill too deeply. Since the two limit stops may have different heights, the drill guide can provide the practitioner with the choice between two different drilling depths using the same dental drill. The external diameter of the hollow tubes of the drill guide should match the internal diameter of the drill holes of the drill jig or the internal diameter of a standardized metal guide sleeve incorporated in the drill jig.

A drill guide disclosed to be useful for sterically hindered implantation sites and for dental drills having wide drilling diameters is described in US 2010/151411 A1. The drill guide comprises a handle and at least one hollow tube having a longitudinal slit extending from the upper end to the lower end of the tube which allows insertion of the dental drill sideways into the hollow tube.

The type of drill guides discussed above requires a practitioner to hold the handle in position throughout the drilling operation. This is to prevent the drill guide from slipping out of the template, which is particularly a problem for procedures in the upper jaw when the drill guide is prone of falling out under gravity. It is also necessary to hold the handle to prevent the drill guide from rotating under the action of the drill. Such rotation can be dangerous and cause injury to the patient. Also, drilling must be performed manually, and the template may also need to be held in position. Thus, the practitioner generally requires assistance by a second person during the drilling procedure.

DE 10 2012 204 462 A1 discloses a drill guide which is screwed into the template using a screw tool. Such screwing is cumbersome and time-consuming.

DE 20 2013 000 576 discloses a drill guide which is releasably secured by a bayonet lock to a sleeve in the template. This drill guide requires locking through a rotational movement which, depending on the location of the drill guide in the mouth, can be awkward to achieve.

US 2010/0129768 A1 discloses a drill axial guidance device comprising an external cylindrical bearing having indexing means adjusting to complementary shapes formed on a band joined to a surgical guide. The same indexing means fixes the device in rotational orientation and limits the insertion depth when positioned in the surgical guide.

US 2016/0310232 A1 discloses a dental drill guide configured to be disposed within the central opening of a dental drill guide positioning ring. The dental drill guide includes a body defining an outer surface having an outer circumferentially formed groove and a first end of the body defining a tapered lead-in portion of the outer surface. An axial coupling is achieved, independent from any rotational motion, by resiliently deflecting flange retention elements of the positioning ring which engage the outer circumferentially formed groove of the dental drill guide and thereby retains the drill guide in the ring. An advantage of the axial coupling is disclosed to be that the drill guide is permitted to freely rotate about its longitudinal axis within the drill guide positioning ring without disengaging.

There therefore remains a need for a drill guide which can be easily and securely yet releasably mounted in a surgical template without the risk of inadvertent axial disengagement and rotation during the surgical procedure.

BRIEF SUMMARY

In a first aspect of the invention, there is provided a dental drill guiding system comprising a drill guide and a guide sleeve. The dental drill guiding system is intended for use in dental implant surgery.

The guide sleeve of the dental drill guiding system comprises an internal surface defining a through bore extending along a central longitudinal axis of the guide sleeve from a coronal end of the guide sleeve to an apical end of the guide sleeve. The internal surface of the guide sleeve comprises an anti-rotation section having a non-circular cross-section in a plane perpendicular to the central longitudinal axis of the guide sleeve, and at least one (i.e. one or more) radially extending undercut formed by an increase in radius of the through bore in the apical direction.

The drill guide of the dental drill guiding system comprises a hollow tube sized for insertion into the coronal end of the through bore of the guide sleeve in the apical direction and having an exterior surface (surrounding the hollow tube) and an interior surface. The interior surface defines a through hole extending along a central longitudinal axis of the hollow tube from a coronal end of the hollow tube to an apical end of the hollow tube. The through hole of the drill guide is configured to receive and guide a dental drill. The exterior surface of the hollow tube comprises an anti-rotation section having a non-circular cross-section in a plane perpendicular to the central longitudinal axis of the hollow tube, the anti-rotation section of the hollow tube being complementary to the anti-rotation section of the guide sleeve, such that when the anti-rotation section of the hollow tube is inserted into the anti-rotation section of the guide sleeve the hollow tube is rotationally fixed relative to the guide sleeve. The exterior surface of the hollow tube further comprises at least one (i.e. one or more) radially extending protrusion limited in the axial extent and formed by an increase in the radius of the exterior surface of the hollow tube in the apical direction, this at least one protrusion being dimensioned for accommodation in the at least one undercut of the guide sleeve, such that when the at least one axially limited protrusion of the hollow tube is housed in the at least one undercut of the guide sleeve the hollow tube is axially retained within the guide sleeve against movement in the coronal direction.

The guiding system of the present invention therefore enables the drill guide to be both rotationally fixed and axially retained in relation to the guide sleeve. This prevents the problems discussed above, namely the inadvertent removal of the drill guide from the guide sleeve or the rotation of the drill guide during drilling. By providing the drill guide with separate elements for rotational fixation and axial retention, the design of both elements can be optimised for their individual function. This increases the performance of the system. The system facilitates assembly of the components and reduces the risk for inadvertent axial disengagement as well as undesired rotation about the central longitudinal axis when the hollow tube of the drill guide is disposed within the guide sleeve during the surgical procedure.

Throughout this specification, in accordance with conventional dental terminology, "apical" refers to the direction towards the bone and "coronal" to the direction towards the teeth. Therefore the apical end of a component is the end which, in use, is disposed closer to the jaw bone and the coronal end is that which, in use, is disposed closer to the oral cavity. Similarly, "in the apical direction" refers to movement towards the apical end of a component or towards the jaw bone while "in the coronal direction" refers to movement towards the coronal end of a component or towards the oral cavity.

The exterior surface of the hollow tube of the drill guide as disclosed herein mates with the internal surface of the through bore of the guide sleeve, thereby allowing insertion and fixation of the hollow tube of the drill guide in the through bore of the guide sleeve.

The hollow tube and guide sleeve of the present invention each extend along a central longitudinal axis. When the hollow tube is inserted into the guide sleeve the central longitudinal axis of the hollow tube is coaxial to the central longitudinal axis of the guide sleeve. Throughout the specification, reference to the "central longitudinal axis" should be taken to mean the central longitudinal axis of the hollow tube when components of the hollow tube are being discussed and the central longitudinal axis of the guide sleeve when components of the guide sleeve are being discussed, or to either the central longitudinal axis of the hollow tube or guide sleeve when the elements discussed can be located on either the guide sleeve or hollow tube. When the interaction of the hollow tube and guide sleeve is discussed, reference to the "central longitudinal axis" refers to both the central longitudinal axis of the hollow tube and of the guide sleeve, as these axes are identical during engagement of the hollow tube with the guide sleeve.

All the preferred embodiments and features described below can generally be combined with one or more of the other preferred embodiments and features, where these preferred features are not technically or structurally mutually exclusive from one another.

The guide sleeve may be an individual component intended for mounting within a dental surgical template or alternatively it may be an integrally formed part of said dental surgical template. In both cases it is preferable that the guide sleeve is formed from a resilient polymeric material, particularly a resilient thermoplastic polymeric material.

This provides the sleeve with suitable compressive and resilient qualities which enable the hollow tube to be rotationally fixed and axially releasably retained within the sleeve.

Suitable materials are high-performance polymers of medical grade, such as polyaryl ether ketones and polyphenylene sulfide (PPS). Examples of polyaryl ether ketones are polyether ketones (PEK), polyetherether ketones (PEEK) and polyetherketone etherketone ketones (PEKEKK). Other suitable materials include polytetrafluorethylenes (PTFE), polypropylenes (PP), polystyrenes (PS), polyamides (PA), polyvinyl chlorides (PVC), polyphenyl sulfones (PPSU), and polyoxymethylene copolymers (POM-C). These materials all have the necessary high-temperature stability, high mechanical strength and withstand sterilization, which make them suitable for medical uses.

In particularly preferred embodiments, the guide sleeve is made of a thermoplastic polymeric material comprising a polyarylether ketone (PAEK), most preferably a polyetherether ketone (PEEK).

Preferably the guide sleeve is an integrally formed, monolithic component.

The guide sleeve may be milled, injection moulded, compression moulded, 3D-printed or a combination of these methods. When the guide sleeve forms an integral part of the dental surgical template it is preferred that the guide sleeve is 3D-printed. When the guide sleeve is an individual component for insertion into a dental surgical template, the guide sleeve is preferably milled and/or injection moulded.

In contrast, it is preferred that the hollow tube of the present invention is formed from a metal, such as stainless steel or a titanium alloy, e.g. TAN. This provides the hollow tube with the necessary strength for guiding a dental drill. It is particularly preferred that the hollow tube is formed from extra hardened stainless steel.

Preferably the hollow tube is an integrally formed, monolithic component.

The hollow tube can be manufactured by, e.g. milling, injection moulding, 3D printing. Preferably the hollow tube is milled.

According to the present invention the drill guide and the guide sleeve both comprise complementary anti-rotation sections which have a non-circular cross-section in a plane perpendicular to the central longitudinal axis of the hollow tube and guide sleeve respectively. The non-circular and complementary nature of the cross-sections means that, within the limits of manufacturing tolerances, relative rotation of the drill guide and guide sleeve is prevented when the hollow tube is inserted into the through bore of the guide sleeve such that the anti-rotation sections are in axial alignment. In this way the components are rotationally fixed relative to one another. The anti-rotation sections could each comprise, for example, matching oval or polygonal cross-sections, e.g. square, hexagonal or octagonal.

Preferably however, the anti-rotation section of one of the hollow tube and guide sleeve comprises at least one radially extending protrusion which is limited in the circumferential extent and the anti-rotation section of the other of the hollow tube and guide sleeve comprises at least one radially extending groove which is limited in the circumferential extent and is dimensioned to house said at least one circumferentially limited protrusion in a rotationally fixed manner.

By "limited in the circumferential extent" (herein also referred to as "circumferentially limited") it is meant that the protrusion(s) and groove(s) do not extend 360° about the central longitudinal axis of the component, but only by a lesser amount, such that the protrusion(s) and groove(s) have lateral, radially extending surfaces when viewed in a plane perpendicular to the central longitudinal axis. When the at least one protrusion is housed in the at least one groove any relative rotation of the components will result in the abutment of these lateral surfaces against one another, thus preventing further relative rotation of the hollow tube and guide sleeve.

Thus, in such embodiments, a first set of one or more protrusion and one or more complementary groove provides a rotational lock thereby restricting rotation about the longitudinal axis when the hollow tube of the drill guide is disposed within the guide sleeve, and a second set of one or more protrusion and one or more complementary undercut provides an axial retention, independent of the rotational lock, thereby preventing inadvertent axial disengagement when the hollow tube of the drill guide is disposed within the guide sleeve (herein referred to as engaged configuration). The guide sleeve retains the hollow tube of the drill guide in the engaged configuration until enough axial force is applied to the drill guide in the coronal direction to disengage the second set of complementary protrusion(s) and undercut(s).

The cross-sections of the complementary protrusion(s) and groove(s) of the first set, in a plane perpendicular to the central longitudinal axis, can have any complementary shape for instance square, V-shaped or curved. It is not necessary for the at least one groove and at least one protrusion to have the same shape, as long as the protrusion can fit within the groove in order to limit relative rotation of the components, e.g., a suitably dimensioned square or rounded protrusion could fit within a V-shaped groove. Preferably, the cross-sections of the complementary protrusion(s) and groove(s) have a curved shape as this is easiest to form from a manufacturing perspective. In one preferred embodiment therefore the at least one groove and at least one protrusion have fully curved cross-sections in a plane perpendicular to the central longitudinal axis, e.g. sinusoidal or arc-shaped. More preferably, the cross-sections of the at least one protrusion and at least one groove, viewed in a plane perpendicular to the central longitudinal axis, are formed of one or more circular sections; that is, sections following an arc having a single radius. In a particularly preferred embodiment one of the at least one protrusion and at least one groove has a cross-section formed entirely by a single circular section, i.e. an arc having a single radius, and the other of the at least one protrusion and at least one groove has a cross-section formed entirely by two or more circular sections. The use of such circular sections provides a beneficial width-to-depth ratio, thereby ensuring sufficient wall thickness of the component and reducing the risk for detrimental deformation during handling and use thereof.

According to the above embodiment, the exterior surface of the hollow tube may comprise a single radially extending, circumferentially limited protrusion shaped to fit within a single radially extending, circumferentially limited groove in the internal surface of the guide sleeve, or vice versa. However, such a system allows only a single rotational orientation between the drill guide and guide sleeve. This can be cumbersome during a surgical operation.

Therefore, it is preferable that the anti-rotation section of one of the hollow tube and guide sleeve comprises at least one radially extending protrusion which is limited in the circumferential extent and the anti-rotation section of the other of the hollow tube and guide sleeve comprises a plurality of radially extending grooves limited in the circumferential extent and spaced about the central longitudinal axis, each circumferentially limited groove being dimensioned to house said at least one circumferentially limited protrusion in a rotationally fixed manner.

Providing multiple circumferentially limited grooves enables the drill guide to be rotationally fixed to the guide sleeve in different orientations, resulting in a system which is easier to use. In such embodiments it is further preferable that the anti-rotation section of one of the hollow tube and guide sleeve comprises a plurality of radially extending protrusions limited in the circumferential extent and spaced about the central longitudinal axis, the plurality of circumferentially limited protrusions being dimensioned to fit within the plurality of radially extending grooves of the anti-rotation section of the other of the hollow tube and guide sleeve in a rotationally fixed manner.

The provision of multiple circumferentially limited protrusions strengthens the system by better distributing the force experienced by the drill guiding system during operation of a drill.

The number of circumferentially limited grooves and protrusions do not need to be equal, however in order to enable a connection between the drill guide and guide sleeve the number of circumferentially limited grooves must be equal to or greater than the number of circumferentially limited protrusions. Preferably the number of radially extending, circumferentially limited protrusions in the anti-rotation section of one of the hollow tube and guide sleeve is equal to the number of radially extending, circumferentially limited grooves in the anti-rotation section of the other of the hollow tube and guide sleeve.

Additionally or alternatively the plurality of protrusions and/or the plurality of grooves do not need to be spaced evenly about the central longitudinal axis of the component. However, for better force distribution and ease of manufacturing it is preferable that the plurality of protrusions are evenly spaced about the central longitudinal axis and/or the plurality of grooves are evenly spaced about the central longitudinal axis. In embodiments in which there are an equal number of protrusions and grooves, the spacing of the protrusions about the central longitudinal axis, whether even or uneven, must be matched by the grooves. In embodiments in which there are a greater number of grooves however, the grooves can be unevenly spaced while the protrusions are evenly spaced or vice versa. Alternatively both the grooves and protrusions can be unevenly spaced. Most preferably however, for ease of manufacturing, the plurality of protrusions and the plurality of grooves are both evenly spaced about the central longitudinal axis of their respective components.

Additionally or alternatively the plurality of protrusions of the anti-rotation section may have different shapes to one another in a cross-section perpendicular to the central longitudinal axis. For example, the plurality of protrusions may consist of one set of protrusions having a first shape and a second set of protrusions having a second shape, protrusions of the first and second set being alternately positioned about the central longitudinal axis. Additionally or alternatively the plurality of grooves of the anti-rotation section may also comprise different shapes in a cross-section perpendicular to the central longitudinal axis. Preferably however the plurality of protrusions are identical and/or the plurality of grooves are identical. Most preferably the plurality of protrusions are identical and the plurality of grooves are identical. This eases manufacturing of both components.

Although, in this preferred embodiment, the plurality of grooves are all identical and the plurality of protrusions are all identical it is not necessary for the protrusions and grooves to be identical to each other. Instead all that is required is that the shapes of the protrusions and grooves are complementary such that the protrusions can fit within the grooves to achieve rotational fixation.

In the above discussed embodiments of the anti-rotation sections of the guide sleeve and hollow tube, either component can comprise the at least one groove or the at least one protrusion. In preferred embodiments however, the anti-rotation section of the hollow tube comprises the above described at least one protrusion, or preferably plurality of protrusions, while the anti-rotation section of the guide sleeve comprises the above described at least one groove, or preferably plurality of grooves.

In a particularly preferred embodiment of the dental drill guiding system, the anti-rotation section of the hollow tube comprises a plurality of identical radially extending protrusions limited in the circumferential extent and evenly spaced about the central longitudinal axis of the hollow tube (i.e. circumferentially spaced around the exterior surface of the hollow tube) and the anti-rotation section of the guide sleeve comprises an equal number of identical radially extending grooves limited in the circumferential extent and evenly spaced about the central longitudinal axis of the guide sleeve (i.e. circumferentially spaced around the internal surface of the guide sleeve), each circumferentially limited groove being dimensioned to house any of said plurality of circumferentially limited protrusions in a rotationally fixed manner.

The equal number of circumferentially limited protrusions and grooves, as well as their uniform distribution, provides an even force distribution about the guide sleeve and hollow tube, increasing the resistance of the system to the rotational forces produced by the drill in use. In addition, such systems are easier to design and manufacture.

As mentioned previously, the cross-sections of the at least one protrusion and at least one groove of the anti-rotation sections of the hollow tube and guide sleeve, in a plane perpendicular to the central longitudinal axis, could be square or V-shaped, but are preferably curved as discussed above. The same cross-sectional shapes previously described are also preferred when the anti-rotation sections comprise a plurality of grooves and protrusions.

In one particularly preferred embodiment, the anti-rotation section of the hollow tube comprises a circular cylindrical outer surface in which a plurality of circumferentially spaced grooves are located, thus forming a plurality of radially extending, circumferentially limited protrusions interposed by said grooves. These protrusions form the protrusions of the anti-rotation section of the hollow tube which will fit within the plurality of grooves of the anti-rotation section of the guide sleeve in order to rotationally fix the components. The grooves formed in the circular cylindrical outer surface can have any cross-sectional shape, e.g. V-shaped, but are preferably curved. Preferably each groove has a cross-section, in a plane perpendicular to the central longitudinal axis, of a single circular arc. The protrusions created by such circular grooves have a cross-section formed by three circular sections; a central section formed by the circular cylindrical outer surface of the anti-rotation section and opposing lateral sections formed by the circular arc of adjacent grooves. In the same embodiment the anti-rotation section of the guide sleeve preferably comprises a circular cylindrical inner surface interposed by a plurality of radially extending, circumferentially limited grooves spaced about the central longitudinal axis. The grooves can have any cross-sectional shape but are preferably curved, most preferably each groove has a cross-section, in a plane perpendicular to the central longitudinal axis, of a single circular arc. The grooves can be spaced such that the grooves are interposed by sections of circular cylindrical surface, or such that the grooves are directly adjacent to one another.

The above preferred embodiment can comprise a plurality of differently shaped and/or unevenly spaced protrusions and/or grooves. For example, if the grooves formed in the circular cylindrical outer surface of the hollow tube are not evenly spaced about the central longitudinal axis, the resulting protrusions will have different circumferential extents. However, preferably the anti-rotation section of the hollow tube comprises a circular cylindrical outer surface in which a plurality of evenly spaced, identical grooves are created, each groove preferably having the cross-section of a single circular arc, as described in the previous paragraph. In the same embodiment the anti-rotation section of the guide sleeve preferably comprises a circular cylindrical inner surface having a plurality of identical, evenly spaced grooves, each groove preferably having the cross-section of a single circular arc as described in the previous paragraph.

The at least one protrusion and at least one groove of the above preferred embodiments of the anti-rotation sections of the hollow tube and guide sleeve are radially extending and limited in the circumferential extent, as discussed above. In addition, each protrusion and groove has a longitudinal length. The longitudinal lengths of the anti-rotation sections of the hollow tube and guide sleeve can be equal or different. Preferably the anti-rotation section comprising one or more radially extending protrusion has a longitudinal length less than the anti-rotation section comprising one or more radially extending groove.

Preferably the at least one protrusion, or each of the plurality of protrusions, of the anti-rotation section of one of the hollow tube and guide sleeve has a longitudinal length greater than its circumferential extent, thus forming one or more radially protruding, longitudinally extending rib limited in the circumferential extent. In such embodiments the at least one groove, or each of the plurality of grooves, of the anti-rotation section of the other of the hollow tube and guide sleeve is shaped to accommodate the at least one rib, or the plurality of ribs, in a rotationally fixed manner. Preferably the cross-section of each rib, in a plane perpendicular to the central longitudinal axis, remains contrast along the length of the rib.

According to the present invention, the hollow tube comprises at least one radially extending protrusion limited in the axial extent and the guide sleeve comprises at least one undercut, the protrusion(s) and undercut(s) cooperating to provide an axial retention between the components. This axial retention is provided independently from the rotational fixation provided by the anti-rotation sections. In other words, the axially limited protrusion of the hollow tube which cooperates with the undercut of the guide sleeve does not form a part of the anti-rotation section which enables the rotational locking of the components.

The axial retention provided by the cooperation of the at least one axially limited protrusion and the at least one undercut prevents inadvertent removal of the hollow tube from the guide sleeve in the coronal direction. The at least one radially extending protrusion of the hollow tube is limited in the axial extent. By "limited in the axial extent" (also referred to herein as "axially limited") it is meant that the protrusion does not extend the full length of the hollow tube.

According to the present invention the at least one undercut of the guide sleeve is formed by an increase in radius of the through bore in the apical direction. This widening of part of the through bore creates a radially extending, apically facing internal surface which forms the coronal end of the at least one undercut, the undercut having a radius equal to the increased radius which forms it.

Similarly, in accordance with the present invention, the at least one axially limited protrusion of the hollow tube is formed by an increase in the radius of the exterior surface in the apical direction. This widening of part of the exterior surface of the hollow tube forms a radially extending, coronally facing exterior surface which forms the coronal end of the at least one axially limited protrusion, the protrusion having a radius equal to the increased radius which forms it. The axially limited protrusion is arranged for accommodation within the undercut. While the axially limited protrusion is housed within the undercut, movement of the hollow tube in the coronal direction will cause the radially extending, apically facing internal surface of the at least one undercut to abut against the radially extending, coronally facing exterior surface of the at least one axially limited protrusion, thus preventing any further movement of the hollow tube in the coronal direction.

It should be noted that the increase in radius of the through bore which forms the at least one undercut and the increase in radius of the exterior surface of the hollow tube which forms the at least one axially limited protrusion does not need to occur about the full circumference of either component. Instead the at least one axially limited protrusion and/or at least one undercut can also be limited in the circumferential extent. For example, the hollow tube may comprise, in addition to any protrusions of the anti-rotation section, a plurality of radially extending protrusions limited in the axial and circumferential extent and spaced about the central longitudinal axis. In such embodiments the coronally facing surface of each of the plurality of axially limited protrusions must lie at the same axial location of the hollow tube. This ensures that each axially limited protrusion can simultaneously provide axial retention in the at least one undercut of the guide sleeve.

Preferably, however, the at least one axially limited protrusion of the hollow tube comprises a single radially extending annular protrusion which is limited in the axial extent and extends about the full circumference of the hollow tube in a plane perpendicular to the central longitudinal axis. This simplifies the design of the hollow tube and hence eases manufacture.

As used herein "annular" means a continuous ring like extension around a circumference. Thus, an annular protrusion of the drill guide circumferentially extends around the exterior surface of the hollow tube and forms a continuous annular protrusion.

While the at least one axially limited protrusion of the hollow tube does not form a part of the anti-rotation section which enables the rotational locking of the components, e.g. it does not form part of the first set of protrusion(s) and groove(s), in some embodiments it is possible for the at least one axially limited protrusion to be directly coronally or apically adjacent to the anti-rotation section of the hollow tube.

However, preferably the at least one axially limited protrusion is located at a discrete axial distance from the anti-rotation section of the hollow tube. This eases construction of the system as the dimensions of the at least one axially limited protrusion can be designed and optimized independently of the anti-rotation section. Preferably the at least one axially limited protrusion is separated from the anti-rotation section of the hollow tube by a portion of exterior surface having a radius less than the maximum radius of the anti-rotation section of the hollow tube. This simplifies construction of an axially limited protrusion having a radius less than the maximum radius of the anti-rotation section, which has particular advantages in certain embodiments to be discussed below.

The at least one axially limited protrusion can be located coronal of the anti-rotation section of the hollow tube. This has the benefit that the axially limited protrusion need not come into contact with the anti-rotation section of the guide sleeve during insertion of the hollow tube into the guide sleeve. However, in such designs an undercut must be created in the coronal region of the guide sleeve, which is a more complex manufacturing step than the creation of such an undercut in the apical region of the guide sleeve, at least when the guide sleeve is milled or injection moulded.

Therefore, preferably the at least one axially limited protrusion is located apical of the anti-rotation section of the hollow tube and more preferably at the apical end of the hollow tube, for example, within the apical most quarter or apical most fifth of the longitudinal length of the hollow tube. Preferably the apical end of the at least one axially extending protrusion forms the apical end of the hollow tube.

When the at least one axially limited protrusion is located apical of the anti-rotation section of the hollow tube it is further preferable that the at least one axially limited protrusion comprises an apically facing surface which tapers radially inwards in the apical direction. The taper can be straight but is preferably curved. Such a tapered surface eases insertion of the hollow tube through the guide sleeve. Preferably the apical end of the tapered surface forms the apical end of the hollow tube.

When the at least one axially limited protrusion is located apical of the anti-rotation section of the hollow tube it is particularly preferable that the radius of the at least one axially limited protrusion is less than the maximum radius of the anti-rotation section of the hollow tube. This eases passage of the at least one axially limited protrusion through the anti-rotation section of the guide sleeve. According to a particularly preferred embodiment therefore the at least one axially limited protrusion is located apical of the anti-rotation section of the hollow tube, the at least one axially limited protrusion being separated from the anti-rotation section of the hollow tube by a portion of exterior surface having a radius less than the maximum radius of the anti-rotation section, the radius of the at least one axially limited protrusion being less than the maximum radius of the anti-rotation section of the hollow tube.

It is further preferable, particularly but not exclusively to embodiments in which the at least one axially limited protrusion is located apical of the anti-rotation section of the hollow tube, to limit the longitudinal length of the at least one axially limited protrusion. This is because the axial retention is provided only by the interaction of the coronally facing surface of the protrusion with the apically facing surface of the undercut. A long length of the at least one axially limited protrusion thus unnecessarily increases the length of the hollow tube. In addition, when the at least one axially limited protrusion is located apical of the anti-rotation section of the hollow tube, it is beneficial to limit the longitudinal length of the protrusion in order to reduce any surface contact between the at least one protrusion and the anti-rotation section of the guide sleeve during insertion.

Therefore, generally it is preferable that the at least one axially limited protrusion has a longitudinal length less than the longitudinal length of the anti-rotation section of the hollow tube, more preferably less than half the length and most preferably less than a quarter of the length of the anti-rotation section of the hollow tube. Additionally or alternatively, it is preferable that the at least one axially limited protrusion has a curved longitudinal cross-section, i.e. in a plane containing the central longitudinal axis. Most preferably the longitudinal cross-section of the at least one axially limited protrusion is formed by an arc having a single radius. This creates a point contact with the internal surface of the guide sleeve and furthermore provides an apically facing surface which tapers radially inwards in the apical direction, which as discussed above is preferable when the axially limited protrusion is located apical of the anti-rotation section of the hollow tube.

According to the present invention, the at least one undercut of the guide sleeve is formed by an increase in the radius of the through bore in the apical direction. Such an increase can be formed, for example, by a groove in the internal surface or the apical end face of a protrusion on the internal surface of the guide sleeve.

It is beneficial that the at least one undercut is arranged to house the at least one axially limited protrusion of the hollow tube at multiple locations about the central longitudinal axis of the guide sleeve. This ensures that a secure axial retention is achieved despite any minor pivoting movement that may be exerted on the hollow tube during use. This can be achieved, for example, by embodiments comprising an annular axially limited protrusion extending around the full circumference of the hollow tube and/or an undercut extending around the full circumference of the guide sleeve. Alternatively, multiple undercuts and/or axially limited protrusions could be arranged about the central longitudinal axis. In each case, it is preferred that the at least one axially limited protrusion is housed in the at least one undercut, when the hollow tube and guide sleeve are in the engaged configuration, at at least 4, more preferably between 4 and 12, most preferably between 8 and 10, locations about the central longitudinal axis of the guide sleeve. Preferably these locations are evenly spaced about the central longitudinal axis.

As discussed above, it is preferable for the at least one axially limited protrusion of the hollow tube to be located apical of the anti-rotation section of the hollow tube.

This simplifies production of the at least one undercut in the guide sleeve. In such embodiments therefore, at least the coronal end of the anti-rotation section of the guide sleeve is located coronally of the at least one undercut. This ensures that, when the hollow tube is inserted into the guide sleeve, the anti-rotation sections of the hollow tube and guide sleeve can be brought into axial alignment in order to provide rotational fixation as well as axial retention.

This location of the at least one undercut can also be used in embodiments in which the at least one axially limited protrusion is located coronal of the anti-rotation section of the hollow tube, as long as the anti-rotation section of the guide sleeve continues apically of the at least one undercut.

In certain preferred embodiments the at least one undercut can be located in the apical portion of the guide sleeve. Preferably the at least one undercut is formed in the apical most half of the guide sleeve, more preferably the apical most quarter, most preferably the apical most fifth. Alternatively or additionally, it is preferable that the at least one undercut is open ended in the apical direction. In other words, following the increase in radius in the apical direction which forms the at least one undercut, the radius is not subsequently decreased for the remainder of the longitudinal length of the guide sleeve. In this way, the at least one undercut does not comprise a coronally facing apical end surface and it is possible to form the undercut via, e.g., a counter sunk bore in the apical end of the guide sleeve. This undercut design also simplifies the tooling used when the guide sleeve is injection moulded.

In a similar manner to the at least one axially limited protrusion of the hollow tube, the at least one undercut of the guide sleeve can be located apical of the anti-rotation section of the guide sleeve. In such embodiments therefore the whole of the anti-rotation section of the guide sleeve is located coronally of the at least one undercut.

While the apical location of the axial retention has benefits in terms of ease of manufacturing, it is then necessary for the at least one axially limited protrusion of the hollow tube to pass through the anti-rotation section of the guide sleeve prior to reaching and locking with the at least one undercut. This can cause difficulties in creating a system in which the hollow tube can be inserted and extracted smoothly without requiring a large amount of force. Such force could damage the guide sleeve and/or could result in the guide sleeve being removed from the template together with the drill guide.

While this problem could be overcome by creating at least one axially limited protrusion and complementary undercut with maximum radii less than the minimum radii of the anti-rotation sections, this results in the need for a large overall thickness of hollow tube and guide sleeve. Large sleeve thicknesses can lead to restrictions in sleeve placement within the template, as well as to increased material and production costs. Further, such a system creates a complex design of the internal surface of the guide sleeve. For design simplicity, as referred to above, it can be preferable that the internal surface of the guide sleeve does not comprise coronally facing internal surfaces, particularly in the apical portion of the guide sleeve, as such surfaces are harder to mill and injection mould.

According to a particularly preferred embodiment therefore, the anti-rotation section of the guide sleeve extends from the coronal end to the apical end of the guide sleeve, the at least one undercut of the guide sleeve being formed in the anti-rotation section at a location apical of the coronal end of the anti-rotation section, the at least one undercut having a radius greater than the minimum radius but less than the maximum radius of the anti-rotation section of the guide sleeve. This provides a simple internal design of the guide sleeve while also easing passage of the axially limited protrusion of the hollow tube through the guide sleeve, as the radius of this protrusion will be less than the maximum radius of the anti-rotation section of the guide sleeve, in order to fit into the at least one undercut. Preferably, as discussed above, the at least one undercut is open ended in the apical direction. This also simplifies the design of the guide sleeve.

Preferably a plurality of circumferentially spaced undercuts are formed in the anti-rotation section of the guide sleeve at a location apical of the coronal end of the anti-rotation section, each undercut having a radius less than the maximum radius and greater than the minimum radius of the anti-rotation section of the guide sleeve, the undercuts being dimensioned such that, at the axial location of the undercuts, all areas of the anti-rotation section having a radius less than the radius of the undercuts are removed, the plurality of undercuts being interposed by areas of anti-rotation section having a greater radius than the undercuts. This enables the at least one axially limited protrusion to be axially retained within the guide sleeve at a plurality of locations.

Such a system is particularly advantageous when the anti-rotation section of one of the hollow tube and guide sleeve, preferably the hollow tube, comprises a plurality of radially extending, circumferentially limited protrusions and the anti-rotation section of the other of the hollow tube and guide sleeve, preferably the guide sleeve, comprises a plurality of radially extending, circumferentially limited grooves, according to the preferred embodiments described above.

As mentioned above, the above described preferred embodiments of guide sleeve, in which the at least one undercut has a radius greater than the minimum radius but less than the maximum radius of the anti-rotation section of the guide sleeve, enable the at least one axially limited protrusion of the hollow tube to have a radius less than the maximum radius of the anti-rotation section of the guide sleeve. Therefore in such embodiments it is particularly preferable that the radius of the at least one axially limited protrusion of the hollow tube is less than the maximum radius of the anti-rotation section of the hollow tube. Preferably the at least one axially limited protrusion of the hollow tube is separated from the anti-rotation section of the hollow tube by a portion of exterior surface having a radius less than the maximum radius of the anti-rotation section of the hollow tube. In preferred embodiments the at least one axially limited protrusion of the hollow tube comprises a single annular protrusion. Such a protrusion can be housed in a plurality of circumferentially spaced undercuts interposed by areas of anti-rotation section having a greater radius than the undercuts.

In all embodiments in which the at least one undercut is formed apical of the coronal end of the anti-rotation section of the guide sleeve, and has a radius greater than the minimum radius of the anti-rotation section of the guide sleeve, the cooperating axially limited protrusion(s) will contact a portion of the anti-rotation section of the guide sleeve as it passes through this before being retained in the at least one undercut. In order to enable the at least one axially limited protrusion to pass smoothly through the anti-rotation section of the guide sleeve while still providing a suitable retention force once retained by the undercut, it is preferable that the difference in radius between the at least one axially limited protrusion of the hollow tube and the minimum radius of the anti-rotation section of the guide sleeve is less than 0.3 mm, more preferably the difference is less than 0.1 mm and greater than 0.005 mm, most preferably the difference in radius is between 0.01 and 0.05 mm. Alternatively or additionally, it is preferred that the radius of the at least one axially limited protrusion of the hollow tube is <0.5% bigger in radius than the minimum radius of the anti-rotation section of the guide sleeve.

The minimum radius of the anti-rotation section of the guide sleeve is measured when the guide sleeve is positioned within a drill template. This is because, in embodiments in which the guide sleeve is a separate component to the template, the guide sleeve usually undergoes a small amount of compression upon entry into the template. This results in the radial dimensions of the guide sleeve shrinking by approximately 0.1-1.2%, which affects the minimum radius of the anti-rotation section. In embodiments in which the guide sleeve is a separate component to the template, prior to insertion of the guide sleeve into the template, the difference in radius between the radius of the at least one axially limited protrusion and the minimum radius of the anti-rotation section of the guide sleeve may be between 0 and 0.05.

It has been surprisingly found that these small size differences are capable of providing the necessary axial retention between the hollow tube and guide sleeve.

Additionally or alternatively, it has also been found that the creation of a guide sleeve having an anti-rotation section comprising a plurality of circumferentially limited grooves spaced, preferably evenly, about the central longitudinal axis is also particularly beneficial in situations in which the at least one axially limited protrusion must pass through and contact the anti-rotation section of the guide sleeve. The creation of multiple circumferentially limited grooves around the central longitudinal axis of the guide sleeve reduces the surface area of the anti-rotation section of the guide sleeve having the minimum radius of the anti-rotation section. An axially limited protrusion located apical of the anti-rotation section of the hollow tube therefore has a reduced area of contact with the anti-rotation section of the guide sleeve and thus can be inserted through the guide sleeve more easily.

Therefore, according to one particularly preferred embodiment the anti-rotation section of the hollow tube comprises a plurality of radially extending protrusions limited in the circumferential extent and spaced about the central longitudinal axis of the hollow tube while the anti-rotation section of the guide sleeve comprises a plurality of radially extending grooves limited in the circumferential extent and spaced about the central longitudinal axis of the guide sleeve, the plurality of radially extending, circumferentially limited protrusions being dimensioned to fit within the plurality of radially extending, circumferentially limited grooves in a rotationally fixed manner, the at least one axially limited protrusion of the hollow tube being located apical of the anti-rotation section of the hollow tube and the at least one undercut being formed apical of the coronal end of the anti-rotation section of the guide sleeve and having a radius greater than the minimum radius of the anti-rotation section of the guide sleeve.

In such embodiments the anti-rotation section of the guide sleeve preferably comprises a circular cylindrical inner surface interposed by a plurality of circumferentially spaced, radially extending grooves, said circular cylindrical surface defining the minimum radius of the anti-rotation section. It is further preferable that, in a plane perpendicular to the central longitudinal axis, the cross-section of the portion of the anti-rotation section of the guide sleeve located coronal of the at least one undercut comprises between 2-15%, preferably between 5-10% of the circular cylindrical surface. In other words, only 2-15%, more preferably 5-10% of the circumference of the circular cylindrical surface remains interposed between the plurality of grooves. In this way, the contact area between the at least one axially limited protrusion of the hollow tube and the anti-rotation section of the guide sleeve is reduced.

In a particularly preferred embodiment of the invention the anti-rotation section of the hollow tube comprises a plurality of radially extending protrusions limited in the circumferential extent and spaced about the central longitudinal axis of the hollow tube. The hollow tube further comprises a radially extending annular protrusion which is limited in the axial extent and which extends about the full circumference of the hollow tube in a plane perpendicular to the longitudinal axis of the hollow tube, this annular protrusion being located apical of and axially separated from said anti-rotation section by a portion of exterior surface having a radius less than the maximum radius of the anti-rotation section of the hollow tube. Moreover, the anti-rotation section of the guide sleeve extends from the coronal to the apical end of the guide sleeve and comprises a plurality of radially extending grooves limited in the circumferential extent and spaced about the central longitudinal axis of the guide sleeve, each circumferentially limited groove being dimensioned to house one of said plurality of circumferentially limited protrusions in a rotationally fixed manner. The guide sleeve further comprises, at a location apical of the coronal end of the anti-rotation section, a plurality of undercuts having a radius greater than the minimum radius but less than the maximum radius of the anti-rotation section of the guide sleeve, the plurality of undercuts being dimensioned such that, at the axial location of the undercuts, all areas of the anti-rotation section having a radius less than the undercuts are removed, the plurality of undercuts being interposed by the remaining areas of the plurality of circumferentially limited grooves, the annular protrusion of the hollow tube being dimensioned for accommodation within the plurality of undercuts such that when the annular protrusion is housed in the plurality of undercuts the hollow tube is axially retained within the guide sleeve against movement in the coronal direction.

When the at least one axially limited protrusion of the hollow tube is located apical of the anti-rotation section of the hollow tube, it is also possible for the at least one undercut of the guide sleeve to be formed by the external apical end surface of the guide sleeve. This end surface forms a radially extending, apically facing surface which can be dimensioned to cooperate with the radially extending coronally facing surface of the at least one axially limited protrusion of the hollow tube in order to axially retain the hollow tube within the guide sleeve against movement in the coronal direction. This provides an alternative solution to the same technical problem of the present invention. Therefore, viewed from an alternative aspect the present invention provides a dental drill guiding system comprising a drill guide and a guide sleeve. The dental drill guiding system is intended for use in dental implant surgery. The guide sleeve of the dental drill guiding system comprises an internal surface defining a through bore extending along a central longitudinal axis of the guide sleeve from a coronal end of the guide sleeve to an apical end of the guide sleeve, the apical end of the guide sleeve comprising a radially extending, apically facing end surface. The internal surface of the guide sleeve comprises an anti-rotation section having a non-circular cross-section in a plane perpendicular to the central longitudinal axis of the guide sleeve. The drill guide of the dental drill guiding system comprises a hollow tube sized for insertion into the coronal end of the through bore of the guide sleeve in the apical direction and having an exterior surface (surrounding the hollow tube) and an interior surface. The interior surface defines a through hole extending along a central longitudinal axis of the hollow tube from a coronal end of the hollow tube to an apical end of the hollow tube. The through hole of the drill guide is configured to receive and guide a dental drill. The exterior surface of the hollow tube comprises an anti-rotation section having a non-circular cross-section in a plane perpendicular to the central longitudinal axis of the hollow tube, the anti-rotation section of the hollow tube being complementary to the anti-rotation section of the guide sleeve, such that when the anti-rotation section of the hollow tube is inserted into the anti-rotation section of the guide sleeve the hollow tube is rotationally fixed relative to the guide sleeve. The exterior surface of the hollow tube further comprises at least one (i.e. one or more) radially extending protrusion limited in the axial extent and formed by an increase in the radius of the exterior surface of the hollow tube in the apical direction, the at least one axially limited protrusion being located apical of the anti-rotation section of the hollow tube and being dimensioned for engagement with the radially extending, apically facing apical end surface of the guide sleeve, such that when the at least one axially limited protrusion of the hollow tube is located apical of this end surface, the hollow tube is axially retained within the guide sleeve against movement in the coronal direction.

The axial retention provided by the cooperation of the at least one axially limited protrusion of the hollow tube and the apical end surface of the guide sleeve prevents inadvertent removal of the hollow tube from the guide sleeve in the coronal direction. According to this alternative aspect of the invention the apical end surface of the guide sleeve forms a radially extending, apically facing external surface which forms the apical end of the guide tube.

The at least one axially limited protrusion of the hollow tube is formed by an increase in the radius of the exterior surface in the apical direction. This widening of part of the exterior surface of the hollow tube forms a radially extending, coronally facing exterior surface which forms the coronal end of the at least one axially limited protrusion, the protrusion having a radius equal to the increased radius which forms it. The axially limited protrusion is arranged for engagement with the radially extending, apically facing external apical end surface of the guide sleeve. When the hollow tube is inserted into the guide sleeve, the at least one axially limited protrusion is located apical of this apical end surface of the guide sleeve. Movement of the hollow tube in the coronal direction will cause the radially extending, apically facing external apical end surface of the guide sleeve to abut against the radially extending, coronally facing exterior surface of the at least one axially limited protrusion, thus preventing any further movement of the hollow tube in the coronal direction.

This alternative aspect of the invention therefore does not require the guide sleeve to comprise an at least one undercut in its internal surface, thus reducing the manufacturing complexity of the guide sleeve.

The anti-rotation sections of the guide sleeve and hollow tube can have any of the configurations discussed above. In particular the anti-rotation sections may comprise a plurality of complementary radially extending, circumferentially limited grooves and protrusions, as discussed above. The anti-rotation section of the guide sleeve preferably extends to the apical end of the guide sleeve and more preferably extends from the coronal end to the apical end of the guide sleeve. In one preferred embodiment the anti-rotation section of the guide sleeve comprises a circular cylindrical inner surface interposed by a plurality of grooves, said circular cylindrical surface defining the minimum radius of the anti-rotation section, wherein, in a plane perpendicular to the central longitudinal axis, the cross-section of the anti-rotation section of the guide sleeve preferably comprises between 2-15%, more preferably between 5-10% of the circular cylindrical inner surface.

The at least one axially limited protrusion can have any of the preferred features discussed above as long as this is located apical of the anti-rotation section of the hollow tube. In particular the at least one axially limited protrusion can be separated from the anti-rotation section of the hollow tube by a portion of exterior surface having a radius less than the maximum radius of the anti-rotation section of the hollow tube. The at least one axially limited protrusion preferably has a radius less than maximum radius of the anti-rotation section of the hollow tube.

The difference in radius between the at least one axially limited protrusion of the hollow tube and the minimum radius of the anti-rotation section of the guide tube can have any of the preferred values discussed above.

Other preferred features of this alternative aspect of the present invention are as described above in relation to the first aspect, insofar as these features are compatible with the alternative aspect.

The drill guide and guide sleeve of the dental drill guiding system of the present invention are considered inventive in their own right and therefore the present invention extends to a drill guide for use in the dental drill guiding system of the first or alternative aspect of the present invention and to a guide sleeve for use in the dental drill guiding system of the first or alternative aspect of the present invention.

More particularly, viewed from a second aspect the present invention provides a drill guide comprising a hollow tube having an exterior surface and an interior surface. The interior surface defines a through hole extending along a central longitudinal axis from a coronal end of the hollow tube to an apical end of the hollow tube, the through hole being configured to receive and guide a dental drill. The exterior surface of the hollow tube comprises an anti-rotation section comprising a plurality of radially extending protrusions limited in the circumferential extent and spaced about the central longitudinal axis. The exterior surface of the hollow tube further comprises at least one radially extending protrusion limited in the axial extent and formed by an increase in the radius of the exterior surface of the hollow tube in the apical direction, said at least one axially limited protrusion being located apical of said anti-rotation section.

Preferably the at least one radially extending protrusion limited in the axial extent is a single annular protrusion which extends about the full circumference of the hollow tube in a plane perpendicular to the central longitudinal axis. Additionally or alternatively the at least one axially limited protrusion is preferably located at a discrete axial distance from the anti-rotation section of the hollow tube, preferably being separated from the anti-rotation section by a portion of exterior surface having a radius less than the maximum radius of the anti-rotation section. Additionally or alternatively, the anti-rotation section of the hollow tube preferably comprises a circular cylindrical outer surface in which a plurality of circumferentially spaced grooves are located, thus forming a plurality of protrusions interposed by said grooves. Preferably the plurality of circumferentially spaced grooves have a cross-section, in a plane perpendicular to the central longitudinal axis, of a single circular arc, and each protrusion preferably has a cross-section, in a plane perpendicular to the central longitudinal axis, formed by three circular sections; a central section formed by the circular cylindrical outer surface of the anti-rotation section and opposing side sections formed by the circular arc of adjacent grooves. Additionally or alternatively the plurality of radially extending protrusions are preferably identical. Additionally or alternatively the plurality of radially extending protrusions are preferably evenly spaced about the central longitudinal axis.

Viewed from a third aspect the present invention provides a guide sleeve comprising an internal surface defining a through bore extending along a central longitudinal axis from a coronal end of the guide sleeve to an apical end of the guide sleeve. The internal surface of the guide sleeve comprises an anti-rotation section comprising a plurality of radially extending grooves limited in the circumferential extent and spaced about the central longitudinal axis, and at least one undercut formed by an increase in the radius of the through bore in the apical direction at a location apical of the coronal end of the anti-rotation section, the radius of said at least one undercut being greater than the minimum radius of the anti-rotation section.

Preferably the anti-rotation section extends from the coronal to the apical end of the guide sleeve. Additionally or alternatively the guide sleeve preferably comprises a plurality of undercuts, these undercuts preferably having a radius less than the maximum radius but greater than the minimum radius of the anti-rotation section. Preferably the plurality of undercuts are dimensioned such that, at the axial location of the undercuts, all areas of the anti-rotation section having a radius less than the radius of the undercuts are removed, the plurality of undercuts being interposed by areas of anti-rotation section having a greater radius than the undercuts. Additionally or alternatively the anti-rotation section of the guide sleeve preferably comprises a circular cylindrical inner surface interposed by a plurality of circumferentially spaced grooves, each groove preferably having a cross-section, in a plane perpendicular to the central longitudinal axis, formed entirely by a single circular arc. Additionally or alternatively the plurality of radially extending grooves are preferably identical. Additionally or alternatively the plurality of radially extending grooves are preferably evenly spaced about the central longitudinal axis Other preferred features of the second and third aspects of the present invention are as described above in relation to the first or alternative aspect.

When reference is made here below to preferred embodiments of the invention, all aspects of the invention are referred to, as far as applicable. For example, references below to a drill guide refer to the drill guide of the first, alternative and second aspects of the invention. References to the guide sleeve refer to the guide sleeve of the first, alternative and third aspects of the invention.

As discussed above, the hollow tube is preferably made of metal. More generally, the drill guide of the present invention is preferably made of a non-resilient material, preferably a metallic material, and more preferably a metallic material having a greater hardness than the material of the surgical drill. The drill guide can be made of, for instance, stainless steel or titanium or titanium alloy. All or parts of the drill guide, for example the hollow tube, can additionally be treated by surface-hardening techniques. One expedient technique for hardening stainless steel is Kolsterizing.

In preferred embodiments, the hollow tube of the drill guide is made of stainless steel, preferably extra hardened stainless steel. More preferably, the whole drill guide is made of metal, such as stainless steel, preferably extra hardened stainless steel.

Preferably, at least all features of the hollow tube, e.g. the anti-rotation section, axially limited protrusion etc, are integrally formed in one monolithic piece. In some embodiments the whole drill guide is integrally formed.

In preferred embodiments, as discussed above, the guide sleeve is formed of a resilient polymeric material. As also discussed above, the guide sleeve may be an integral part of a dental surgical template or it may be an individual component for insertion into such a template.

When the guide sleeve is an individual component it is preferable that the guide sleeve further comprises an external surface extending from the coronal to the apical end of the guide sleeve. In preferred embodiments the external surface comprises a plurality of longitudinally extending ribs for assisting with insertion and fixation of the sleeve within the template. Additionally or alternatively the external surface may comprise one or more longitudinally extending planar surface, preferably extending from the coronal to the apical end of the sleeve. Such surfaces reduce the width of the sleeve and enable closer placement of multiple sleeves within the template. Preferably the external surface comprises two diametrically opposing planar surfaces. Alternatively or additionally the external surface may comprise, at its coronal end, a circumferential flange. This flange may extend fully, partially or intermittently about the coronal end of the through bore. The flange can therefore act as a depth stop to ensure that the sleeve is correctly seated in the template, a stop surface to support the drill guide and, depending on the shape of the flange, may also act to fix the rotational orientation of the sleeve relative to the template. Preferably the flange extends fully about the central longitudinal axis of the through bore.

According to the present invention the drill guide comprises a hollow tube having the features and optional preferred features discussed above. Preferably, the drill guide further comprises a handle extending from the coronal end portion of the hollow tube at an angle to the central longitudinal axis. The handle enables the surgeon to easily grasp the drill guide and to insert and remove the hollow tube from the guide sleeve.

The hollow tube of the drill guide may be releasably attached to, fixedly coupled to or integral with the handle. Preferably, the hollow tube of the drill guide is fixedly coupled, preferably welded, to an end portion of the handle.

Once the hollow tube has been inserted into the guide sleeve such that it is axially retained within the guide sleeve, the surgeon can let go of the handle, at which point the weight of the handle may cause the hollow tube to pivot slightly within the guide sleeve.

Such a pivoting motion increases, at least on one side of the guide sleeve, the amount of the at least one axially limited protrusion housed within the at least one undercut. In embodiments comprising a handle therefore, it is particularly preferable that the difference in radius between the at least one axially limited protrusion of the hollow tube and the minimum radius of the anti-rotation section of the guide sleeve is less than 0.1 mm and greater than 0.005 mm, more preferably between 0.01 mm and 0.05 mm. This is because the tilting of the hollow tube experienced during use enhances the axial fixation. In order to enable the hollow tube to be easily removed from the guide sleeve after use it is advantageous that the protrusion is not deeply held within the undercut. The relatively small difference in radius discussed above has been found to provide a firm yet easily disconnected axial fixation between the components.

The drill guide may comprise a bearing surface, which may be an essentially flat, apically facing surface. The bearing surface is intended to rest on the template and/or the guide sleeve, preferably, where present, on the flange of the guide sleeve, during the drilling process to provide greater stability and to prevent displacement of the drill guide during the drilling.

The drill guide's bearing surface may be formed by a part of the underside of the handle directly adjacent to the hollow tube of the drill guide. Thus, when the hollow tube is engaged with the guide sleeve, the underside of the handle of the drill guide rests at least partially on the template and/or the guide sleeve. In this way, the practitioner is provided with greater stability during drilling, such that the drill guide does not slip.

Preferably however, the exterior surface of the hollow tube further comprises, at its coronal end, a radially extending collar said collar forming an apically facing bearing surface extending about the through hole in a plane perpendicular to the central longitudinal axis of the hollow tube.

This is beneficial as the collar provides a bearing surface which extends about the full circumference of the through hole that will guide the drill in use.

The distance from the coronal end of the hollow tube of the drill guide to the bearing surface provides the height (thickness), h, of the collar along the central longitudinal axis of the hollow tube. The upper, coronally facing, surface of the collar can also act as a bearing surface for a drill stop. Drill stops are well known in the art and consist of a collar placed or integrally formed on a drill shaft, which increases the diameter of the drill, thus limiting the depth to which the drill can be inserted through the through hole. The thinner the collar of the drill guide, the deeper a particular drill can be inserted into the template and thus into the patient's bone. Preferably, the height, h, of the collar is between 1 mm and 10 mm, more preferably 1-4 mm. In addition, it is also possible for the guide sleeve to play a role in determining the penetration depth of the drill. The guide sleeve may have a collar at its coronal end, designed to protrude coronally from the template. This collar could, for example, be an extension of the above described flange. Alternatively, the template can be designed to have differing longitudinal lengths (depths), such that the coronal end of the template, and hence guide sleeve, is located at different distances from the patient's jaw. The drilling depth is then also determined by the distance from the coronal end of the guide sleeve to the bone surface. The closer the guide sleeve is arranged to the bone surface, the deeper the drilling depth achieved.

In certain preferred embodiments the exterior surface of the hollow tube further comprises, coronal of the anti-rotation section, a circular cylindrical guide portion. This guide portion may extend from the coronal end of the anti-rotation section to the coronal end of the hollow tube or, where present, to the apical end of the collar. The circular cylindrical guide portion is sized for accommodation in the guide sleeve and provides support and stability to the drill guide. In embodiments of the invention in which the anti-rotation section of the guide sleeve extends from, or near, the coronal end of the guide sleeve, the circular cylindrical guide portion preferably has a radius equal to the minimum radius of the anti-rotation section of the guide sleeve.

In preferred embodiments in which the drill guide comprises a handle, a hollow tube in accordance with the present invention may be arranged at each end of the handle. Thus, the drill guide may further include a second hollow tube, this tube having the features, including any or all of the preferred features, as discussed above. The first and second hollow tubes are preferably connected to opposite ends of the handle. In a drill guide comprising two hollow tubes and a handle, the two hollow tubes may have through holes of different diameters and/or collars of different heights. The hollow tubes of the drill guide are designed for rotational fixation and axial retention in the same guide sleeve. Thus, the hollow tubes preferably have identical anti-rotation sections, axially limited protrusion(s) and, where present, circular cylindrical guide portions.

A drill guide comprising two hollow tubes (instead of just one hollow tube) enables the number of drill guides needed by the surgeon to be reduced. This reduces the number of guides which must be bought, stored and sterilised by the dental practice. If the two hollow tubes of the drill guide have different internal diameters, for instance, a simple turning of the drill guide allows the practitioner to insert a hollow tube of greater internal diameter into the template. With a matched set of two drill guides comprising two hollow tubes each, four different drill diameters are covered, which is sufficient for most dental drilling methods.

In a specific embodiment, the drill guide includes a first hollow tube and a second hollow tube, the first and second hollow tubes being configured to be disposed within a guide sleeve provided in a dental surgical template, the first hollow tube being connected to a first end portion of a handle and the second hollow tube being connected to a second end portion of the handle opposite the first end portion in an axial direction of the handle, the through holes of the first and second hollow tubes having the same minimum diameter such that they can receive and guide the same diameter of drill. The exterior surface of each of the first and second hollow tube of the drill guide comprises at its coronal end a radially extending collar forming an apically facing bearing surface, the collars having different heights and preferably being connected to the respective end portions of the handle. In this way a single drill guide provides two alternative drilling depths for the same drill diameter.

The handle of the drill guide may be one-part or multi-part. It can be rigid or shapeable. It can also have a flat, semicircular or round cross-section in a plane perpendicular to the longitudinal axis of the handle. The length of the handle is chosen such that the potential drilling sites in the jaw bone can be reached and the handle can preferably be grasped outside the oral cavity. In order to ensure the surgeon can comfortably use the handle it is preferable that this is at least 4 cm in length. A preferred handle of the drill guide has a length of between 5 and 12 cm.

Preferably the handle extends from the hollow tube at approximately right angles, e.g. 85-95°, to the central longitudinal axis of the hollow tube. This prevents the handle from impeding the insertion of the drill into the hollow tube or the insertion of the hollow tube into the guide sleeve.

The handle may extend along a single plane. Instruments used in dental implantology should however take into account the dimensions and physiology of the patient's mouth. It may therefore be advantageous that the handle of the drill guide is angled. Thus, the handle preferably comprises a first section which extends at approximately right angles to the central longitudinal axis of the hollow tube and a second section which extends in the coronal direction at an angle greater than 0° and less than 90°, preferably between 30 and 60°, to the first section. This improves the ease and comfort of holding and positioning the handle within the mouth.

When the drill guide comprises two hollow tubes, each end of the handle preferably comprises the first and second sections described above. Preferably the handle further comprises a central section extending between the opposing second sections, the central section preferably extending in a plane approximately parallel to the first sections.

More generally, the handle preferably comprises an S-shaped portion, the S-shaped portion being arranged adjacent to the at least one hollow tube. In some embodiments, the handle can be bent by hand, thus allowing for exact adjustment of the drill guide to the patient's physiology.

The through hole of the one or more hollow tube of the drill guide is preferably circular cylindrical along its entire longitudinal length, which eases manufacture and provides the best guidance of the dental drill. In other embodiments however the coronal portion of the through hole may be conically tapered in the apical direction in order to assist with insertion of the drill. In each case, the through hole preferably has a minimum diameter, $D_1$, along at least three quarters of the length of the hollow tube.

The minimum diameter, $D_1$, of the through hole of the hollow tube corresponds to the diameter of the dental drill with which it is intended for use. Dental drill diameters are generally between 2 and 6.5 mm and thus the minimum diameter of the through hole is preferably between 2 and 6.5 mm. Preferred internal diameters of the through hole of the hollow tube are 2.2, 2.8, 3.5, 4.2, 5.2 and 6.2 mm.

In some embodiments the coronal end portion of the through hole may be slightly wider than the minimum diameter in order to accommodate certain drill geometry irrelevant to its cooperation with the hollow tube. Thus, the coronal end portion of the through hole may have a diameter $D_2$ greater than the minimum diameter of the through hole in order to facilitate insertion of the drill into the through hole. Preferably the diameter $D_2$ is no more than 20% greater than the minimum diameter $D_1$. For example, in embodiments where the minimum diameter, $D_1$, of the through hole of the hollow tube is 2.2 mm, the diameter, $D_2$, of the through hole may be 2.5 mm.

In drill guides comprising two hollow tubes, it is possible for the two hollow tubes to have different minimum diameters, $D_1$. For instance, one hollow tube may have a minimum diameter of 3.5 mm and the other hollow tube may have a minimum diameter of 4.2 mm. However, as discussed above, in preferred embodiments, when a drill guide comprises two hollow tubes these tubes have equal minimum diameters, each tube comprising a collar at its coronal end, the collars having different heights, e.g. 1 and 3 mm.

With reference to US 2010/0151411, mentioned in the background section, the exterior surface of at least one hollow tube of the drill guide as disclosed herein may have a longitudinal slit extending along the longitudinal length of the hollow tube from the apical end to the coronal end of the hollow tube. This enables a drill to be inserted laterally into the hollow tube which can be advantageous when working at the back of the mouth where space is limited. In other embodiments however, the exterior surface of the hollow tube extends continuously about the full circumference of the hollow tube, thus forming a closed through hole.

When using a plurality of drill guides, a coding arrangement can be employed. The colour codes often used on dental drills can be adopted for the drill guides and can be applied at a suitable location, for example on the handle near the corresponding hollow tube of the drill guide. Alternatively, the hollow tube itself can be painted in the appropriate colour.

Several drill guides which have hollow tubes with different minimum diameters, collar heights etc, can be made available in one set. Therefore, according to a further aspect, the present invention comprises a kit of dental drill guides according to the second aspect of the present invention. The drill guides can have any of the preferred features discussed above. In particular, one or more drill guide of the kit may comprise two hollow tubes at opposing ends of a handle, the hollow tubes of such drill guides having through holes with the same minimum diameter and collars of differing heights. The kit may comprise drill guides having hollow tubes with at least four, preferably 6, different minimum diameters.

In a further aspect of the invention, there is provided a dental surgical template for use in dental implant surgery, wherein one or more guide sleeves as disclosed herein is inserted or integrally formed in the dental surgical template. The dental surgical template is intended for use with the drill guide of the present invention. The template is preferably made of a thermoplastic polymeric material, which may be a 3D-printable thermoplastic polymeric material, such as VeroWhite, RGD525, RGD450/430, polypropylene. The dental surgical template may be moulded or 3D-printed using any known technique and materials e.g. Polyjet technology with photo curable liquids.

In a further aspect of the invention, there is provided a dental drill guiding system comprising a plurality of drill guides as disclosed herein and one or more guide sleeves as disclosed herein. The one or more guide sleeves may be mounted in or integrally formed in a dental surgical template. The exterior surface of each hollow tube of the drill guides is arranged to fit within the through bore of the one or more guide sleeve in a rotationally fixed and axially retained manner. The interior surface of each hollow tube has a minimum diameter configured to guide a dental drill, one or more of the hollow tubes of the plurality of drill guides preferably having different minimum diameters as disclosed hereinbefore. In addition one or more of the hollow tubes of the plurality of drill guides may comprise a radially extending collar. When two or more of the hollow tubes comprise collars these collars may have differing heights as discussed hereinbefore.

BRIEF DESCRIPTION OF THE DRAWINGS

Certain preferred embodiments of the present invention shall now be described, by way of example only, with reference to the accompanying drawings, in which.

DETAILED DESCRIPTION

Figure 1:
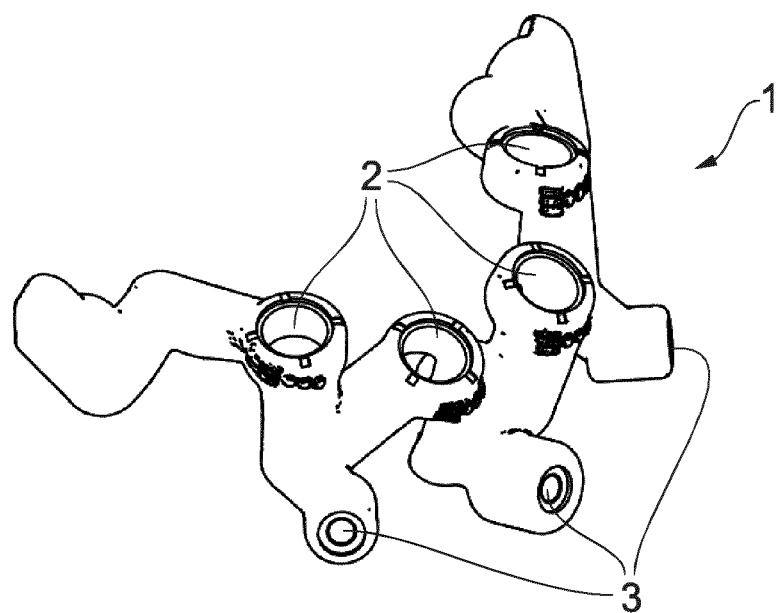
FIG. 1 shows an example of a standard dental surgical template.

The present invention relates to a dental drill guiding system comprising a drill guide and a guide sleeve, for use with a dental surgical template. Such a template 1 is shown in FIG. 1. The template 1 is individually formed to fit over a patient's bone and existing dentition. Template drill holes 2 are created in the template 1 having the position and orientation necessary for drilling boreholes for the optimal placement of dental implants within the patient's jaw. In addition, the template 1 comprises fixation holes 3, through which screws can be temporarily fastened to the jaw bone in order to fix the template in place. The exact location and orientation of the drill holes 2 is usually determined using preoperative planning software and the template 1 is designed using CADCAM methods. Templates are typically formed using milling and increasingly 3D-printing technology. As these technologies cannot always be relied upon to create an accurately dimensioned template drill hole 2, separate guide sleeves are traditionally placed in the template drill holes 2 in order to ensure that the drills, often in combination with a drill guide, are accurately guided.

Figure 2A:
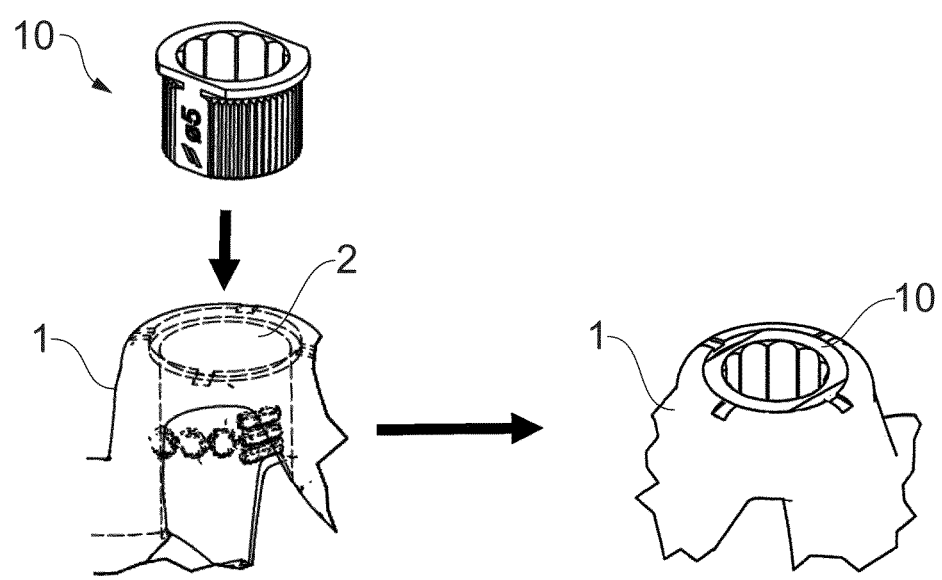
FIG. 2A shows a guide sleeve according to an embodiment of the present invention and its insertion into the template of FIG. 1.

FIG. 2A shows a separate guide sleeve 10 in accordance with a preferred embodiment of the present invention. This separate guide sleeve 10 is inserted into the drill hole 2 of a template 1. Following insertion into the template drill hole 2 the guide sleeve 10 remains permanently within the template 1.

Figure 2B:
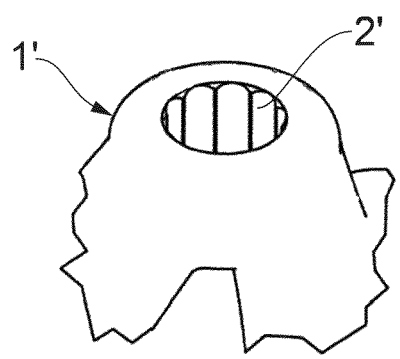
FIG. 2B shows an alternative dental surgical template in which a preferred embodiment of the guide sleeve of the present invention is integrally formed.

As template manufacturing methods, in particular 3D printing, become more accurate, the need for separate guide sleeves is reduced. Instead the internal geometry of the guide sleeves 10 can be accurately printed directly into the template drill holes 2. Such a possibility is shown in FIG. 2B. Here template 1' comprises a drill hole 2' in which the internal features of the guide sleeve 10 are integrally formed.

Figure 3A:
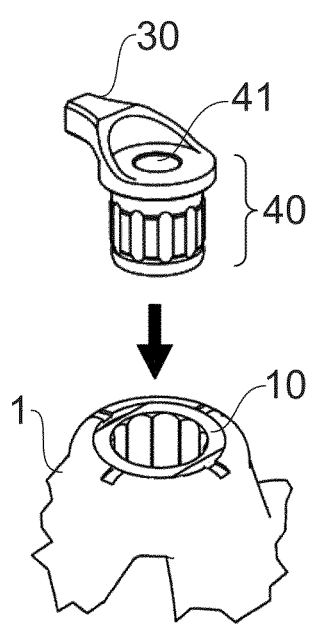
FIG. 3A illustrates the use of a dental drill guide according to a preferred embodiment of the present invention with the guide sleeve and template shown in FIG. 2A.
Figure 3B:
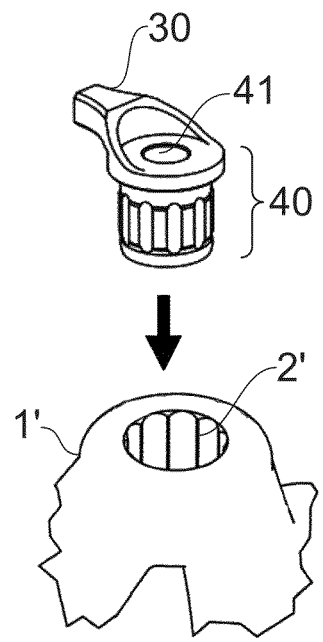
FIG. 3B illustrates the use of a dental drill guide according to a preferred embodiment of the present invention with the template shown in FIG. 2B.

The dental drill guiding system of the present invention comprises a guide sleeve, which can either be provided as a separate component 10 or as an integral part of the template 2', and a drill guide 30 having a hollow tube 40 for insertion into the guide sleeve 10, 2'. FIGS. 3A and 3B show how the drill guide 30 of the present invention can be inserted into the guide sleeve, regardless of whether the guide sleeve is a separate component 10 fixed in the template 1 (FIG. 2A) or forms an integral part of the template 1' (FIG. 2B). As will be discussed further below, the exterior surface of the hollow tube 40 mates with the internal surface of the guide sleeve 10, 2' in order to rotationally fix and axially retain the hollow tube 40 within the guide sleeve 10, 2', while the internal surface defines a through hole 41 for receiving and guiding a drill in a standard manner.

Figure 4:
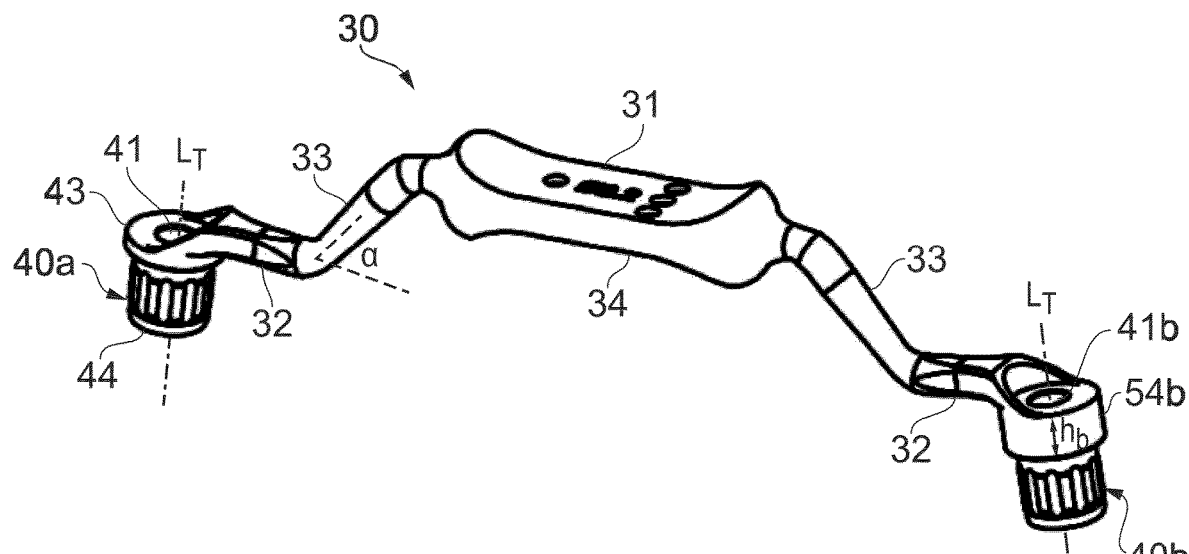
FIG. 4 illustrates a dental drill guide of a particularly preferred embodiment of the invention.

FIGS. 4 and 5A-E show a preferred embodiment of a drill guide 30 according to the present invention. FIG. 4 shows a drill guide 30 comprising a handle 31 for gripping by the surgeon. At each end of the handle 31 the drill guide 30 comprises hollow tubes 40a, 40b. Each hollow tube 40a, 40b is connected to the handle at its coronal end by a first section 32 of the handle 31 which extends at approximately right angles to the central longitudinal axis $L_T$ of the hollow tube 40a, 40b. A second section 33 of the handle 31 extends at an angle α of approximately 45° to the first section 32 in the coronal direction. These second sections 33 join to opposing ends of a central section 34 which has a similar angular orientation to the first sections 31. The first 32, second 33 and central 34 sections therefore form two S-shaped portions at either end of the handle 31. This shape is beneficial for placing the hollow tubes 40a, 40b within the mouth with maximum ease for the surgeon and comfort for the patient.

Hollow tube 40a is shown in more detail in FIGS. 5A-E. Hollow tube 40a has an exterior surface 42 and an interior surface, the interior surface defining a through hole 41 extending along a central longitudinal axis $L_T$ from a coronal end 43 to an apical end 44, the hollow tube 40a being sized for insertion into a guide sleeve, as shown in FIGS. 2A and B.

Through hole 41 is circular cylindrical along its entire longitudinal length L. The majority of through hole 41 has minimum diameter $D_1$. This minimum diameter $D_1$ corresponds to the diameter of the dental drill which will be guided by hollow tube 40a. The coronal end of through hole 41 has a slightly greater diameter $D_2$ than the minimum diameter $D_1$ in order to assist with insertion of the drill into the through hole 41.

The exterior surface 42 of the hollow tube 40a comprises an anti-rotation section 45 and a radially extending annular protrusion 46 limited in the axial extent and positioned apical of and axially distinct from the anti-rotation section 45.

The anti-rotation section 45 of the hollow tube 40a comprises a plurality of identical radially extending protrusions 47 limited in the circumferential extent and evenly spaced about the central longitudinal axis $L_T$ of the hollow tube 40a. As each protrusion 47 is circumferentially limited, it does not extend about the full circumference of the hollow tube 40a and consequently each protrusion 47 has lateral surfaces 47a, 47b when viewed in a plane perpendicular to the central longitudinal axis $L_T$ (see FIG. 5E). In the present embodiment the anti-rotation section 45 is formed by a circular cylindrical outer surface 48 in which a plurality of evenly circumferentially spaced identical grooves 49 are created, said grooves 49 having a cross-section in a plane perpendicular to the central longitudinal axis $L_T$ of a circular arc. The protrusions 47 are thus formed between these grooves 49 and have a cross-section in a plane perpendicular to the central longitudinal axis $L_T$ formed of three circular sections: a central section 47c, formed by the circular cylindrical outer surface 48, and opposing lateral surfaces 47a, 47b which are each formed by the circular arc of the adjacent grooves 49. Forming the protrusions 47 using circular cross-sections provides a good width to depth ratio, maintaining the thickness and hence strength of the hollow tube 40a.

The protrusions 47 of the anti-rotation section 45 have a longitudinal length greater than their circumferential extent and therefore form a plurality of radially protruding, longitudinally extending ribs, the cross-sections of these ribs remaining constant along the length of the ribs.

The annular axially limited protrusion 46 is located at the apical end 44 of the hollow tube 40a. As the protrusion 46 is limited in the axial extent it does not extend along the full length of the hollow tube 40a. Instead it is formed by an increase in the radius of the exterior surface 42 in the apical direction, thus creating a radially extending coronally facing exterior surface 50.

Figure 5A:
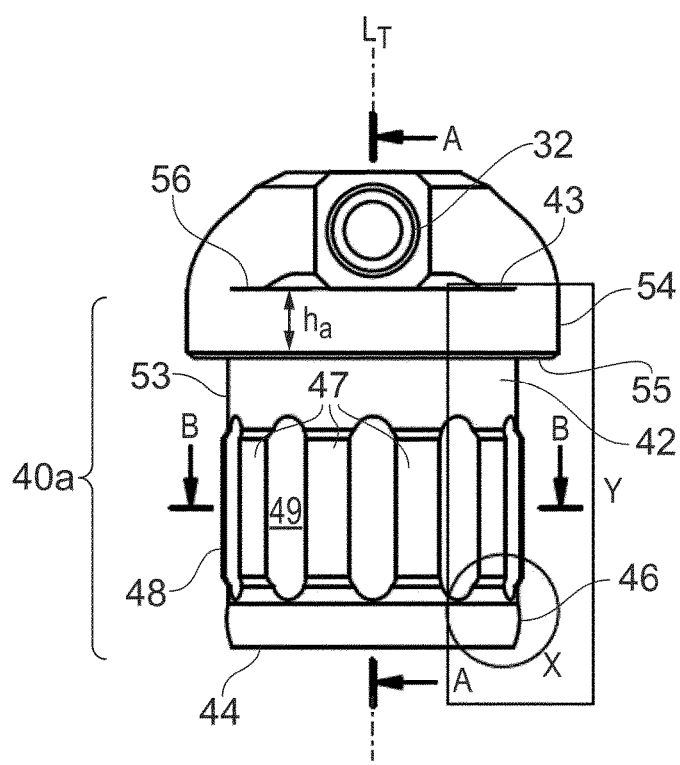
FIG. 5A shows a front view of one of the hollow tubes of the dental drill guide of FIG. 4.
Figure 5B:
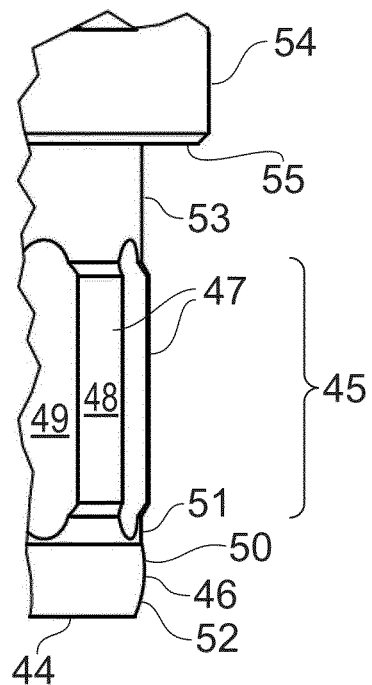
FIG. 5B shows detail Y of FIG. 5A.
Figure 5C:
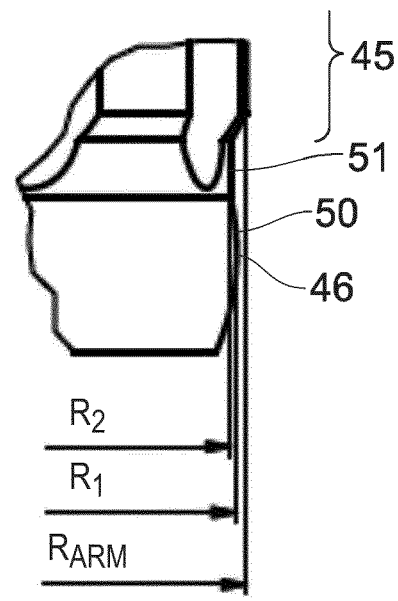
FIG. 5C shows detail X of FIG. 5A.
Figure 5D:
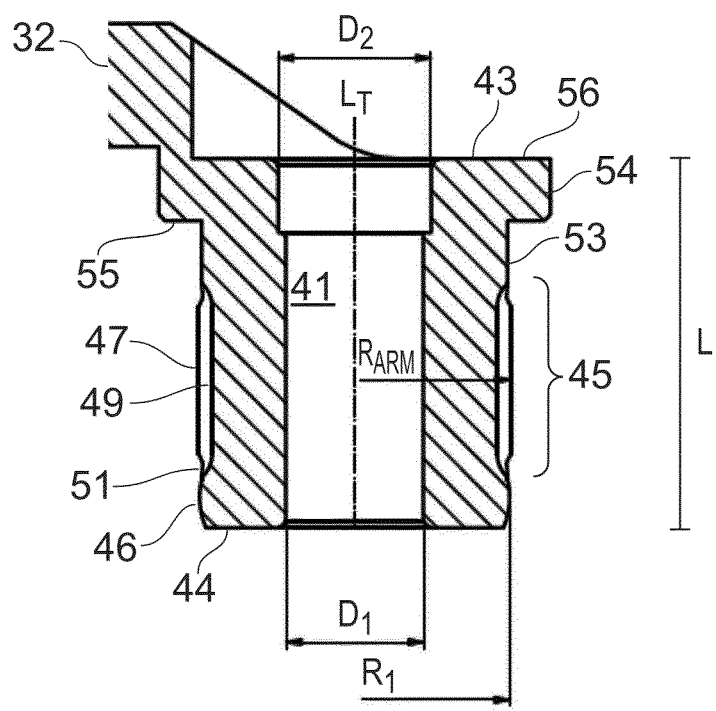
FIG. 5D shows cross-section A-A of FIG. 5A.
Figure 5E:
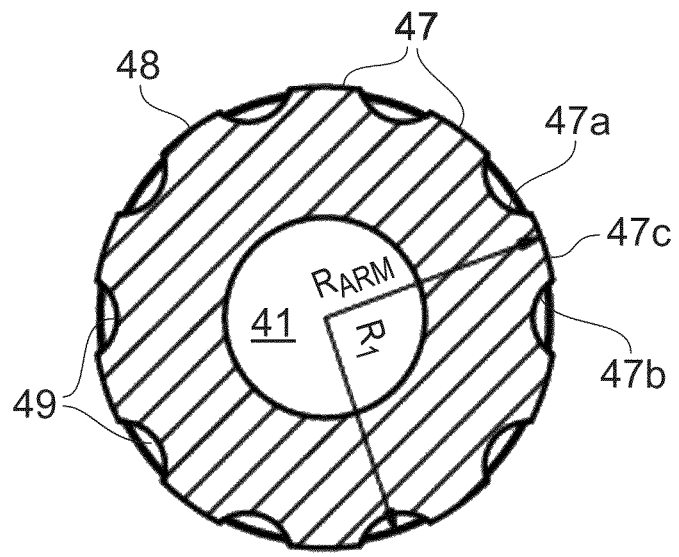
FIG. 5E shows sectional view B-B of FIG. 5A.

In the present embodiment the axially limited protrusion 46 is separated from the anti-rotation section 45 by a portion 51 of the exterior surface 42 which has a radius $R_2$ less than the maximum radius of the anti-rotation section $R_{ARM}$ (see FIG. 5C). This enables the increase in radius which forms the protrusion 46 to start from a radius less than the maximum radius of the anti-rotation section $R_{ARM}$. In this way the radius $R_1$ of the protrusion 46 is less than the maximum radius of the anti-rotation section $R_{ARM}$. This has benefits when inserting the hollow tube 40a into the guide sleeve, as will be discussed further below.

The axially limited protrusion 46 has a longitudinal cross-section formed by a circular arc. This creates a tapered apically facing surface 52, the apical end of which forms the apical end 44 of the hollow tube 40a. The tapered nature of surface 52 assists with insertion of the hollow tube 40a into the guide sleeve, and also reduces the area of the protrusion 46 which will be brought into contact with the anti-rotation section of the guide sleeve.

The hollow tube 40a of the drill guide 30 further comprises a circular cylindrical guide portion 53 coronal of the anti-rotation section 45 and, coronal of guide portion 53, a radially extending collar 54. This collar forms an apically facing bearing surface 55 which extends about through hole 41 in a plane perpendicular to the central longitudinal axis $L_T$. In use bearing surface 55 rests against the upper surface of the template 1, 1'. Additionally the collar 54 has a coronally facing bearing surface 56, which forms the coronal end 43 of the hollow tube 40a. This bearing surface 56 can be used in combination with a drill stop attached to a drill shaft, of the type well known in the art, in order to limit the penetration depth of the drill. Collar 54 has a height $h_a$.

Hollow tube 40b is almost identical to hollow tube 40a and therefore will not be described in detail. In particular hollow tube 40b has an identical anti-rotation section 45, axially limited protrusion 46 and circular cylindrical guide portion 53 to hollow tube 40a. In this way, both hollow tubes 40a, 40b can rotationally and axially lock to the same guide sleeve. Hollow tube 40b differs from hollow tube 40a in that the height $h_b$ of the collar 54b is greater, thus altering the depth to which the same drill can be inserted into the bone. In addition, the diameter of through hole 41b may differ to that of through hole 41, such that hollow tube 40b can be used to guide a different diameter of drill to hollow tube 40a.

The length, L, of the hollow tubes 40a, 40b may be within the range of from 3 to 9 mm such as about 6-8 mm.

The drill guide 30 of FIGS. 4 and 5A-E is intended for use with guide sleeve 10, shown in FIGS. 6A-D. While this guide sleeve 10 is shown as a separate component, all the internal features of this guide sleeve could alternatively be integrally formed in a template drill hole 2'.

Figure 6A:
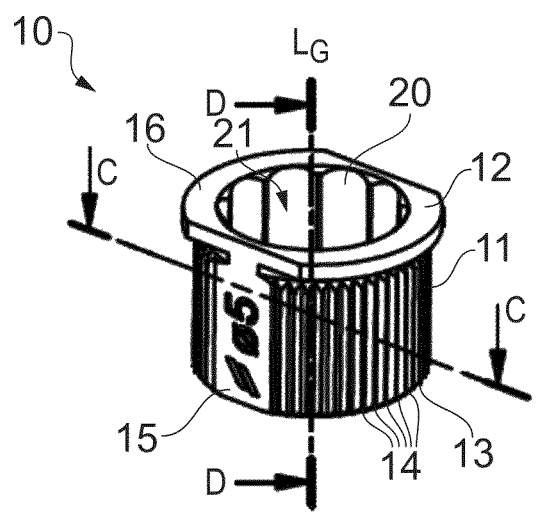
FIG. 6A shows a perspective view of a guide sleeve of a preferred embodiment of the present invention.
Figure 6B:
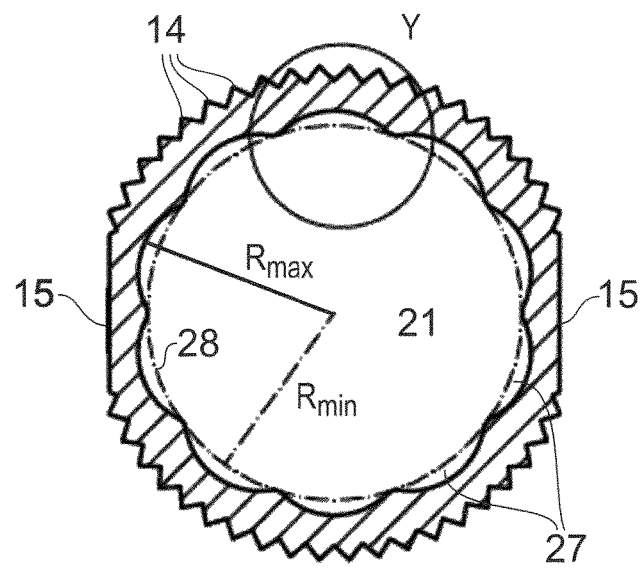
FIG. 6B shows a cross-sectional view C-C of FIG. 6A.
Figure 6C:
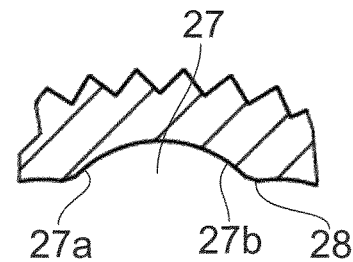
FIG. 6C shows detail Y of FIG. 6B.
Figure 6D:
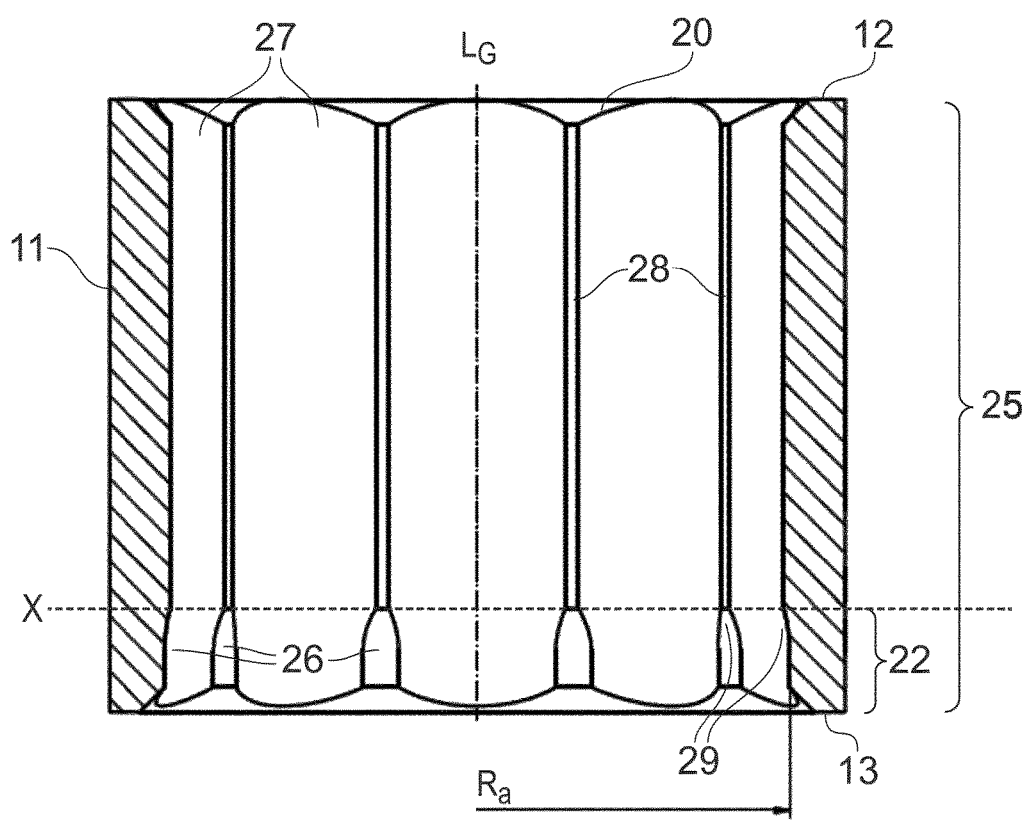
FIG. 6D shows a sectional view D-D of FIG. 6A.

As best seen in FIG. 6A, guide sleeve 10 comprises an external surface 11 extending from the coronal end 12 to the apical end 13 of the guide sleeve along longitudinal axis $L_G$. The external surface 11 comprises a plurality of longitudinally extending ribs 14. These ribs 14 enable the external surface 11 to contract in order to assist in the insertion and fixation of the guide sleeve 10 within a template drill hole 2. In addition, the external surface 11 has two diametrically opposing longitudinally extending planar surfaces 15, to reduce the width of the sleeve 10. At its coronal end 12 the external surface 11 further comprises a radially extending flange 16 which extends about the full circumference of the guide sleeve 10 and which acts as a depth stop when placing the sleeve 10 in the template 1.

The guide sleeve 10 further comprises an internal surface 20 which defines a through bore 21 extending along the central longitudinal axis $L_G$ of the guide sleeve 10 from the coronal end 12 to the apical end 13. The internal surface comprises an anti-rotation section 25 extending from the coronal end 12 to the apical end 13 of the guide sleeve 10. The anti-rotation section 25 comprises a plurality of identical, radially extending grooves 27 limited in the circumferential extent and evenly spaced about the central longitudinal axis $L_G$ of the guide sleeve 10. The cross-section of each groove 27, in a plane perpendicular to the central longitudinal axis $L_G$, forms a circular arc. The grooves 27 are formed in a circular cylindrical inner surface 28 and small sections of this surface 28, in this case approximately 8% of the total circumference of surface 28 remains interposed between the grooves 27. The radius $R_{min}$ of the inner surface 28 forms the minimum radius of the anti-rotation section 25. When viewed in a plane perpendicular to the central longitudinal axis $L_G$ each groove 27 can be seen to have lateral surfaces 27a, 27b.

Apical of the coronal end of the anti-rotation section 25, in an apical portion 22 of the through bore 21, a plurality of undercuts 26 are formed. These undercuts 26 are formed by an increase in radius of the through bore 21 in the apical direction, such that at the coronal end of each undercut 26 a radially extending, apically facing internal surface 29 is formed. The radius $R_a$ of the undercuts 26 is greater than the minimum radius $R_{min}$ of the anti-rotation section 25 but less than the maximum radius $R_{max}$ of the anti-rotation section 25. The undercuts 26 are dimensioned such that, at the axial location of the undercuts 26, all areas of the anti-rotation section 25 having a radius less than the radius $R_a$ of the undercuts 26 are removed. Consequently, the plurality of undercuts 26 are interposed by the areas of grooves 27 having a greater radius than the radius $R_a$ of the undercuts 26. The plurality of undercuts 26 extend the full length of apical portion 22, such that these undercuts 26 are open ended in the apical direction. This increases the ease of manufacture of the undercuts 26.

Figure 7A:
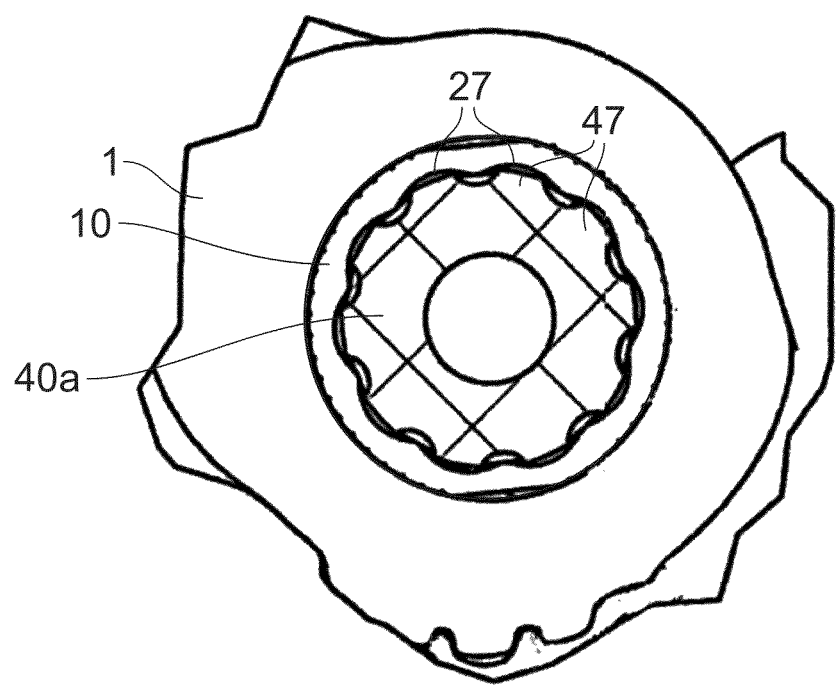
FIG. 7A shows a cross-section, in a plane perpendicular to the longitudinal axis, through an assembly of the hollow tube of the drill guide of FIGS. 5A-E and the guide sleeve of FIGS. 6A-D when positioned in a dental template.

In use the hollow tubes 40a, 40b are inserted into the through bore 21 of guide sleeve 10 and the exterior surface 42 of the hollow tubes 40a, 40b and internal surface 20 of the guide sleeve 10 mate to provide rotational fixation and axial retention as will be described below with reference to FIGS. 7A and 7B.

The plurality of protrusions 47 of the hollow tube 40a are dimensioned to fit within the plurality of grooves 27 disposed on the internal surface 20 of the guide sleeve 10. When a protrusion 47 is housed in a groove 27, any relative rotation of the hollow tube 40a relative to the guide sleeve 10 results in the abutment of a lateral surface 47a, 47b of the protrusion 47 against a lateral surface 27a, 27b of the groove 27, if indeed these surfaces were not already in contact. Relative rotation about the longitudinal axis $L_T$, $L_G$ is thereby restricted when the hollow tube 40a of the drill guide 30 is disposed within the guide sleeve 10, thus rotationally fixing the drill guide 30 relative to the guide sleeve 10.

The number of grooves 27 corresponds to the number of protrusions 47 in order to provide a secure rotational lock and to provide an even and optimal force distribution. However, in other embodiments there may be a lesser number of protrusions than grooves.

Moreover, upon insertion of the hollow tube 40a into the guide sleeve 10, the annular protrusion 46 of the hollow tube 40a is housed in the plurality of undercuts 26 of the guide sleeve 10. Once the annular protrusion 46 is housed in the plurality of undercuts 26, any movement of the hollow tube 40a in the coronal direction will cause the coronally facing exterior surface 50 of the protrusion 46 to abut against the apically facing surfaces 29 of the undercuts 26, thereby preventing inadvertent axial disengagement when the hollow tube 40 of the drill guide 30 is disposed within the guide sleeve 10. The hollow tube 40 is thus axially retained in the guide sleeve 10.

In this particular embodiment, the radius, $R_1$, of the annular protrusion 46 of the hollow tube 40 is slightly greater than the minimum radius $R_{min}$ of the anti-rotation section 25 of the guide sleeve 10 as measured after insertion of the guide sleeve 10 into the template 1, during which the guide sleeve 10 may be slightly radially compressed, e.g. by approximately 1%. As disclosed hereinbefore, this difference in radius is preferably less than 0.05 mm. This small difference in radius assists in the passage of the protrusion 46 through the anti-rotation section 25 while still providing a secure axial retention. During insertion of the hollow tube 40*a* through the guide sleeve 10, the surface 28 will be slightly radially compressed in the radially outwards direction by the annular protrusion 46. However, once the annular protrusion 46 reaches apical portion 22, surface 28 will decompress and the annular protrusion 46 of the hollow tube 40*a* of the drill guide 30 will be retained in the undercuts 26 of the guide sleeve 10 until enough axial force is applied to disengage the annular protrusion 46 from the undercuts 26.

In this embodiment, circular cylindrical guide portion 53 of the hollow tube 40 has a radius equal to the minimum radius $R_{min}$ of the anti-rotation section 25 of the guide sleeve 10. This enables this portion 53 of the hollow tube 40*a* to provide further support and stability to the drill guide 30.

Figure 7B:
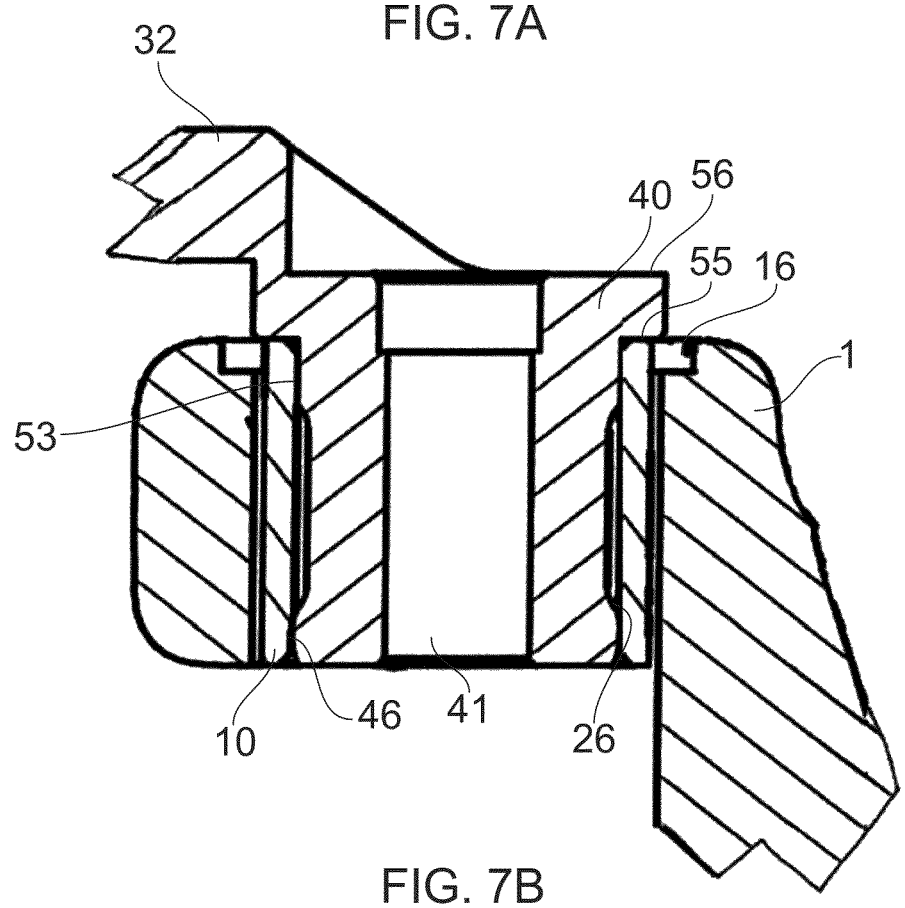
FIG. 7B shows a longitudinal cross-section through the assembly of FIG. 7A.

As can be seen in FIG. 7B, bearing surface 55 rests on the upper surface of the flange 16 of guide sleeve 10. This flange 16 provides a flat, level surface on which the bearing surface 55 can be supported. In other embodiments however the bearing surface 55 may rest directly on the template 1, 1'.

As discussed above, according to the alternative aspect of the present invention the guide sleeve does not comprise at least one undercut in its internal surface. Guide sleeve 10 of FIGS. 6A-D could be adapted to form a guide sleeve according to this alternative aspect by removing the part of the guide sleeve apical of dotted line X. This adapted guide sleeve therefore does not comprise any undercuts 26 and instead a radially extending, apical facing external surface is created at the apical end of the guide sleeve.

In this alternative aspect, upon insertion of the hollow tube 40*a* into the adapted guide sleeve, the annular protrusion 46 of the hollow tube 40*a* is located apical of the apical end of the guide sleeve, i.e. apical of dotted line X. Once the annular protrusion 46 is in this location, any movement of the hollow tube 40*a* in the coronal direction will cause the coronally facing exterior surface 50 of the protrusion 46 to abut against the radially extending, apically facing external apical end surface of the adapted guide sleeve, thereby preventing inadvertent axial disengagement when the hollow tube 40 of the drill guide 30 is disposed within this adapted guide sleeve 10. The hollow tube 40 is thus axially retained in the adapted guide sleeve 10.

Figure 9:
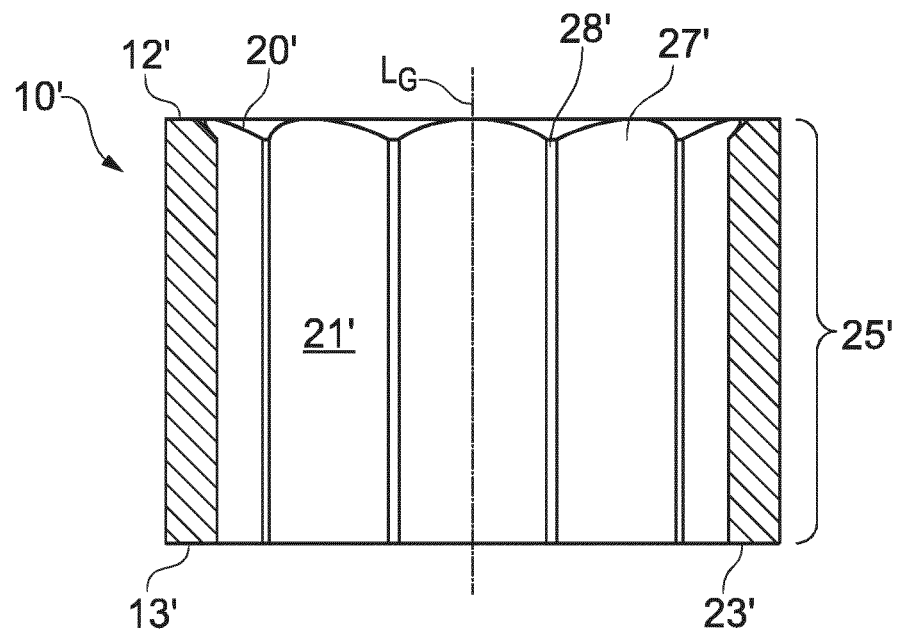
FIG. 9 shows a cross-sectional view, in a plane containing the central longitudinal axis, of a modified guide sleeve according to an alternative aspect of the present invention.
Figure 10:
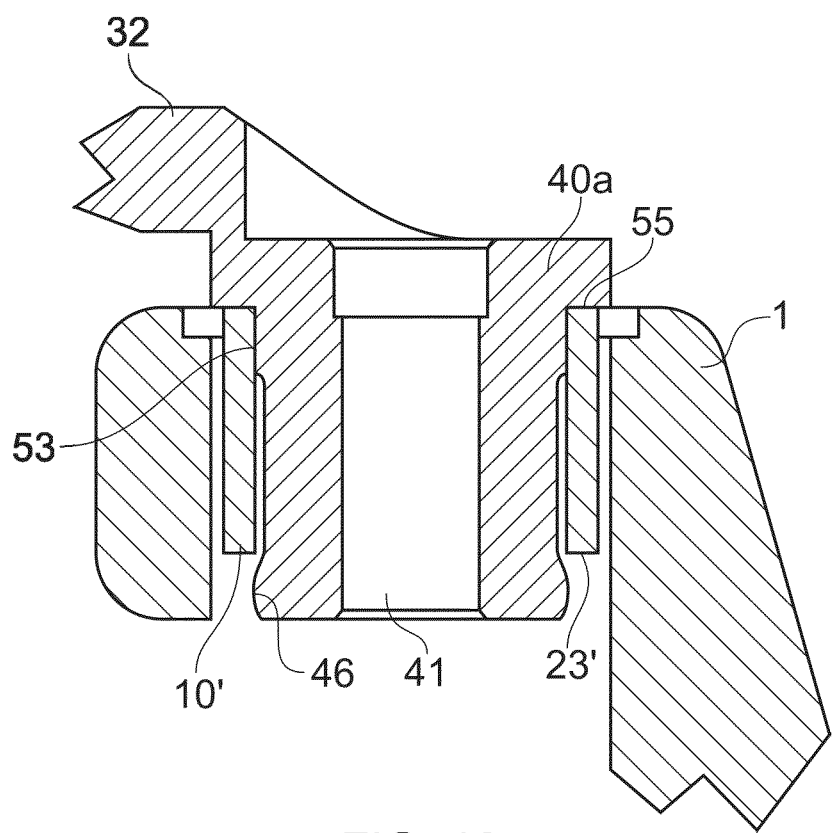
FIG. 10 shows a longitudinal cross-section through an assembly of the hollow tube of FIG. 5A-E of the dental drill guide of FIG. 4 and the guide sleeve of FIG. 9 when positioned in a dental template.

This alternative aspect is shown in FIGS. 9 and 10. FIG. 9 shows a longitudinal cross-section, i.e. a cross-section in a plane containing the central longitudinal axis $L_G$, through alternative guide sleeve 10'. The internal surface 20' of guide sleeve 10' defines a through bore 21' and comprises an identical anti-rotation section 25', with grooves 27' and circular cylindrical inner surface 28', to that of guide sleeve 10. However, in contrast to guide sleeve 10, alternative guide sleeve 10' does not comprise any undercuts and instead the cross-section of the anti-rotation section 25' perpendicular to the longitudinal axis $L_G$ remains constant to the apical end 13' of the guide sleeve 10'. The apical end 13' of the guide sleeve 10' forms a radially extending, apically facing external end surface 23'.

In this alternative aspect, upon insertion of the hollow tube 40*a* into the alternative guide sleeve 10', the annular protrusion 46 of the hollow tube 40*a* is located apical of the apical end 13' of the guide sleeve. Once the annular protrusion 46 is in this location, any movement of the hollow tube 40*a* in the coronal direction will cause the coronally facing exterior surface 50 of the protrusion 46 to abut against the radially extending, apically facing external end surface 23' of the alternative guide sleeve 10', thereby preventing inadvertent axial disengagement when the hollow tube 40*a* of the drill guide 30 is disposed within this alternative guide sleeve 10'.

The hollow tube 40*a* is thus axially retained in the alternative guide sleeve 10', as shown in FIG. 10.

Figure 8A:
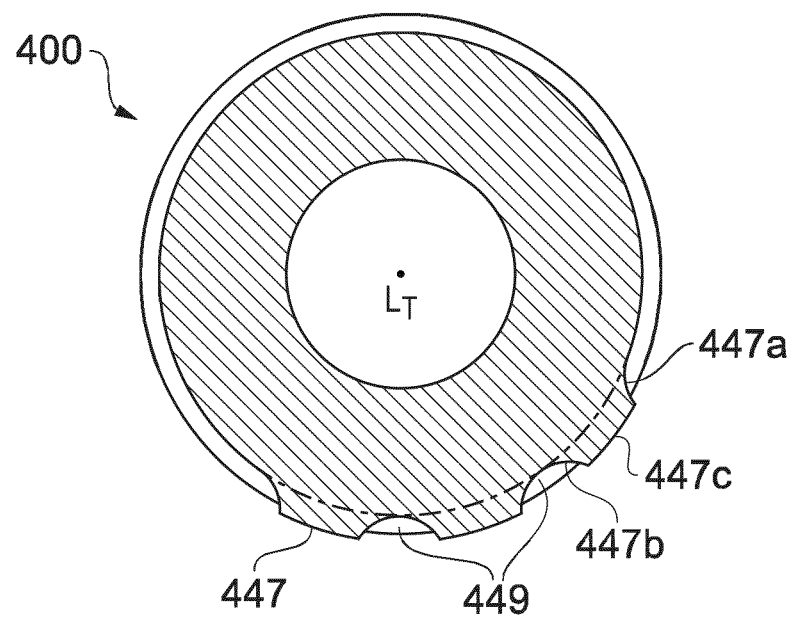
FIG. 8A shows a cross-sectional view, in a plane perpendicular to the central longitudinal axis, of the anti-rotation section of a hollow tube according to an alternative embodiment of the present invention.

As mentioned above, in other embodiments of the present invention it is not necessary for the anti-rotation sections of the guide sleeve and hollow tube to comprise equal numbers of grooves and protrusions. FIG. 8A shows an alternative hollow tube 400 for use with the guide sleeve 10 of FIGS. 6A-D. FIG. 8A is equivalent to FIG. 5E and like features are identified with like reference numerals. FIG. 8A shows a cross-section through the anti-rotation section of hollow tube 400 in a plane perpendicular to the central longitudinal axis $L_T$. In contrast to hollow tube 40*a*, the anti-rotation section of hollow tube 400 comprises only three protrusions 447 unevenly spaced about the axis $L_T$. These protrusions 447 are interposed by grooves 449 and have the same shape as the protrusions 47 of hollow tube 40*a*. As a result, protrusions 447 have an identical central section 447*c* and lateral surface 447*a*, 447*b* to the protrusions 47 of hollow tube 40*a*. The hollow tube 400 is therefore able to be inserted into and rotationally lock with guide sleeve 10. Protrusions 447 will be housed in the plurality of grooves 27 disposed on the internal surface 20 of the guide sleeve 10. When a protrusion 447 is housed in a groove 27 any relative rotation of the hollow tube 400 relative to the guide sleeve 10 results in the abutment of a lateral surface 447*a*, 447*b* of the protrusion 447 against a lateral surface 27*a*, 27*b* of the groove 27. Relative rotation about the longitudinal axis $L_T$, $L_G$ is thereby restricted.

Figure 8B:
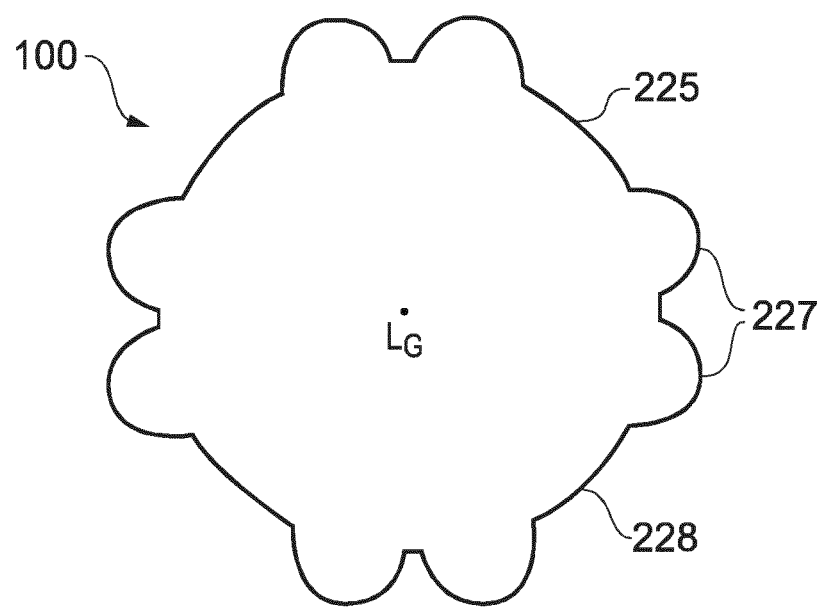
FIG. 8B shows a schematic representation of the anti-rotation section of a guide sleeve according to a further embodiment of the present invention.

FIG. 8B shows a schematic representation of the cross-section, in a plane perpendicular to the central longitudinal axis $L_G$, of an anti-rotation section 225 of an alternative embodiment of a guide sleeve 100. Here, the anti-rotation section 225 is formed by a plurality of grooves 227 arranged in an unevenly spaced manner about the central longitudinal axis $L_G$. The grooves 227 are interposed by sections of circular cylindrical surface 228. Such an anti-rotation section 225 can be used, for example, with a complementary hollow tube having a plurality of complementary protrusions for accommodation within the grooves 227.

The number of complementary protrusions could be equal to the number of grooves 227, in which case the protrusions will be spaced in an identical manner to grooves 227. However, it is also possible for the cooperating hollow tube to have a lesser number of protrusions. In such cases the complementary protrusions could be either unevenly or evenly spaced about the central longitudinal axis of the hollow tube, e.g. four protrusions arranged at 90° to one another.

FIGS. 8A and 8B therefore provide examples in which the protrusions and grooves of the anti-rotation sections do not need to be evenly spaced about the central longitudinal axis.

Figure 11A:
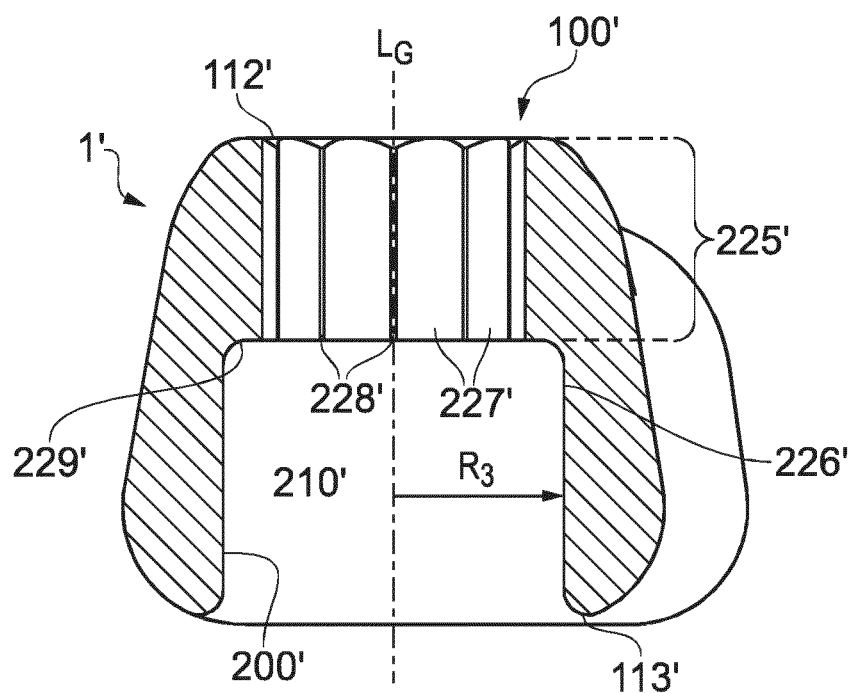
FIG. 11A shows a longitudinal cross-section through a template comprising a guide sleeve in accordance with another preferred embodiment of the present invention.

Finally, FIGS. 11A and B provide an example of a guide sleeve in which the anti-rotation section does not extend to the apical end of the sleeve. In this embodiment, guide sleeve 100' is an integral part of template 1'. Internal surface 200' defines a through bore 210' extending along the central longitudinal axis $L_G$ of the guide sleeve 100' from the coronal end 112' to the apical end 113'. The internal surface 200' comprises an anti-rotation section 225' having a plurality of identical, radially extending grooves 227' limited in the circumferential extent and evenly spaced about the central longitudinal axis $L_G$ of the guide sleeve 100'. The cross-section of each groove 227', in a plane perpendicular to the central longitudinal axis $L_G$, forms a circular arc. The grooves 227' are formed in a circular cylindrical inner surface 228' and small sections of this surface 228', remain interposed between the grooves 227'. In this regard the anti-rotation section 225' is identical to the anti-rotation section 25 of guide sleeve 10, described in relation to FIGS. 6A-D.

However, in contrast to anti-rotation section 25, anti-rotation section 225' does not extend to the apical end 113' of the through bore 210'. Instead guide sleeve 100' comprises an undercut 226' apical of the anti-rotation section 225'. The radius $R_3$ of the undercut 226' is greater than the maximum radius of the anti-rotation section 225' and the undercut 226' extends about the full circumference of through bore 210'. The radius of the through bore 210' is not subsequently decreased, such that the undercut 226' is open ended in the apical direction. At the coronal end of the undercut 226' a radially extending, apically facing internal surface 229' is formed.

Figure 11B:
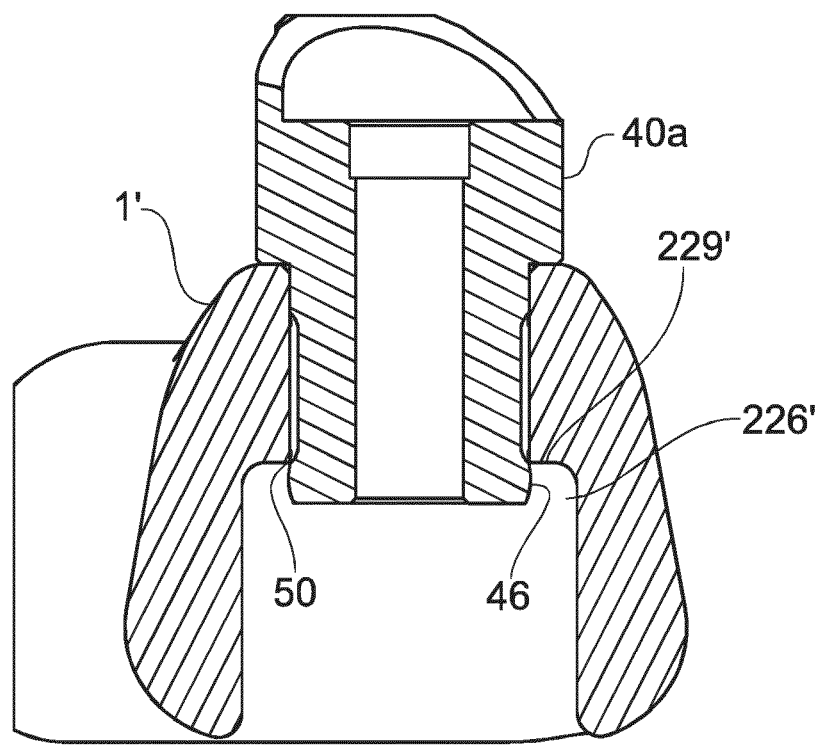
FIG. 11B shows the template of FIG. 11A in combination with the hollow tube of FIGS. 5A-E.

Hollow tube 40a of the drill guide 30 described in relation to FIGS. 4, 5A-E can be used in combination with guide sleeve 100' of template 1', as shown in FIG. 11B. Upon insertion of hollow tube 40a into guide sleeve 100' the anti-rotation sections 45, 225' interact to prevent relative rotational movement as described above in relation to FIGS. 7A and 7B. The annular protrusion 46 of the hollow tube 40a is housed in the undercut 226' of the guide sleeve 100'. Once the annular protrusion 46 is housed in the undercut 226', any movement of the hollow tube 40a in the coronal direction will cause the coronally facing exterior surface 50 of the protrusion 46 to abut against the apically facing surface 229' of the undercut 226', thereby preventing inadvertent axial disengagement when the hollow tube 40a of the drill guide 30 is disposed within the guide sleeve 100'. The hollow tube 40a is thus axially retained in the guide sleeve 100'.

The above described embodiments are for illustrative purposes only and the skilled person will realize that alternative arrangements are possible which fall within the scope of the claims. For example, numerous alternative shapes are possible for the anti-rotation sections of the hollow tube and guide sleeve. Additionally, the axially limited protrusion may be formed directly apically of the anti-rotation section of the hollow tube and may be a plurality of axially limited protrusions, for example directly apically adjacent to the grooves 49. Alternatively the at least one axially limited protrusion could be positioned coronally of the anti-rotation section of the hollow tube. The internal surface of the guide sleeve may be configured such that the anti-rotation section does not extend the length of the sleeve and the undercut may be positioned axially remote from the anti-rotation section in either the apical or coronal direction.

The invention claimed is:

1. A dental drill guiding system for use in dental implant surgery, the system comprising a drill guide and a guide sleeve,
the guide sleeve of the dental drill guiding system comprising:
an internal surface defining a through bore extending along a central longitudinal axis of the guide sleeve from a coronal end of the guide sleeve to an apical end of the guide sleeve, the internal surface of the guide sleeve comprising:
an anti-rotation section having a non-circular cross-section in a plane perpendicular to the central longitudinal axis of the guide sleeve, and
at least one radially extending undercut formed by an increase in a radius of the through bore in an apical direction towards the apical end, and
the drill guide of the dental drill guiding system comprising:
a handle for gripping by a surgeon, and
a hollow tube sized for insertion into the coronal end of the through bore of the guide sleeve in the apical direction and having an exterior surface and an interior surface, the interior surface defining a through hole extending along a central longitudinal axis of the hollow tube from a coronal end of the hollow tube to an apical end of the hollow tube, the through hole being configured to receive and guide a dental drill, the coronal end of the hollow tube being connected to the handle, the exterior surface of the hollow tube comprising:
an anti-rotation section having a non-circular cross-section in a plane perpendicular to the central longitudinal axis of the hollow tube, the anti-rotation section of the hollow tube being complementary to the anti-rotation section of the guide sleeve, such that when the anti-rotation section of the hollow tube is inserted into the anti-rotation section of the guide sleeve, the hollow tube is rotationally fixed relative to the guide sleeve, and
at least one radially extending first protrusion limited in an axial extent and formed by an increase in a radius of the exterior surface of the hollow tube in the apical direction, the at least one radially extending first protrusion being dimensioned for accommodation in the at least one radially extending undercut of the guide sleeve, such that when the at least one radially extending first protrusion of the hollow tube is housed in the at least one radially extending undercut of the guide sleeve, the hollow tube is axially retained within the guide sleeve against movement in a coronal direction towards the coronal end of the guide sleeve,
wherein the drill guide is monolithic.

2. The dental drill guiding system of claim 1, wherein the anti-rotation section of one of the hollow tube and the guide sleeve comprises a plurality of radially extending second protrusions limited in a circumferential extent and spaced about the central longitudinal axis, and
the anti-rotation section of the other of the hollow tube and the guide sleeve comprises a plurality of radially extending grooves limited in a circumferential extent and spaced about the central longitudinal axis, the plurality of radially extending second protrusions being dimensioned to fit within the plurality of radially extending grooves in a rotationally fixed manner.

3. The dental drill guiding system of claim 2, wherein the plurality of radially extending second protrusions are evenly spaced about the central longitudinal axis and/or the plurality of radially extending grooves are evenly spaced about the central longitudinal axis, and the plurality of radially extending second protrusions are identical and the plurality of radially extending grooves are identical.

4. The dental drill guiding system of claim 2, wherein a cross-section of the plurality of radially extending grooves and the plurality of radially extending second protrusions, in a plane perpendicular to the central longitudinal axis, are fully curved.

5. The dental drill guiding system of claim 1, wherein the at least one radially extending first protrusion of the hollow tube comprises a single radially extending annular protrusion which is limited in the axial extent and extends about a full circumference of the hollow tube in a plane perpendicular to the central longitudinal axis.

6. The dental drill guiding system of claim 1, wherein the at least one radially extending first protrusion is located apical of the anti-rotation section of the hollow tube.

7. The dental drill guiding system as claimed in claim 6, wherein a radius of the at least one radially extending first protrusion is less than a maximum radius of the anti-rotation section of the hollow tube.

8. The dental drill guiding system of claim 1, wherein the anti-rotation section of the guide sleeve extends from the coronal end to the apical end of the guide sleeve, the at least one radially extending undercut of the guide sleeve being formed in the anti-rotation section at a location apical of a coronal end of the anti-rotation section, the at least one radially extending undercut having a radius greater than a minimum radius but less than a maximum radius of the anti-rotation section of the guide sleeve.

9. The dental drill guiding system of claim 8, wherein the at least one radially extending undercut is a plurality of undercuts that are circumferentially spaced, each undercut of the plurality of undercuts having a radius less than the maximum radius and greater than the minimum radius of the anti-rotation section of the guide sleeve, the plurality of undercuts being dimensioned such that, at the location of the plurality of undercuts, all areas of the anti-rotation section having a radius less than the radius of the plurality of undercuts are removed, the plurality of undercuts being interposed by areas of anti-rotation section having a greater radius than the plurality of undercuts.

10. The dental drill guiding system of claim 1, wherein the at least one radially extending undercut of the guide sleeve is open ended in the apical direction.

11. A drill guide comprising:
a handle for gripping by a surgeon, and
a hollow tube having an exterior surface and an interior surface, the interior surface defining a through hole extending along a central longitudinal axis from a coronal end of the hollow tube to an apical end of the hollow tube, the through hole of the drill guide being configured to receive and guide a dental drill, the coronal end of the hollow tube being connected to the handle,
the exterior surface of the hollow tube comprising:
at least one radially extending first protrusion limited in an axial extent and formed by an increase in a radius of the exterior surface of the hollow tube in an apical direction towards the apical end, and
an anti-rotation section comprising a plurality of radially extending second protrusions limited in a circumferential extent and spaced about the central longitudinal axis, wherein:
said at least one radially extending first protrusion is located apical of said anti-rotation section, and
wherein the drill guide is monolithic.

12. The drill guide as claimed in claim 11, wherein
the plurality of radially extending second protrusions are evenly spaced about the central longitudinal axis, and
the plurality of radially extending second protrusions are identical.

13. The drill guide as claimed in claim 11, wherein the at least one radially extending first protrusion of the hollow tube comprises a single radially extending annular protrusion which is limited in the axial extent and extends about a full circumference of the hollow tube in a plane perpendicular to the central longitudinal axis.

14. The drill guide as claimed in claim 11, wherein the at least one radially extending first protrusion is separated from the anti-rotation section of the hollow tube by a portion of the exterior surface of the hollow tube, said portion having a radius less than a maximum radius of the anti-rotation section of the hollow tube.

15. The drill guide as claimed in claim 11, wherein a radius of the at least one radially extending first protrusion is less than a maximum radius of the anti-rotation section of the hollow tube.

16. A combination of the drill guide as claimed in claim 11 and a guide sleeve, the guide sleeve being one of a first guide sleeve and a second guide sleeve,
the first guide sleeve comprising:
an internal surface defining a through bore extending along a central longitudinal axis from a coronal end of the first guide sleeve to an apical end of the first guide sleeve, the internal surface of the first guide sleeve comprising
an anti-rotation section comprising a plurality of radially extending grooves limited in a circumferential extent and spaced about the central longitudinal axis of the first guide sleeve, and
at least one undercut formed by an increase in a radius of the through bore in an apical direction towards the apical end, the at least one undercut being located apical of a coronal end of the anti-rotation section, a radius of said at least one undercut being greater than a minimum radius of the anti-rotation section,
the second guide sleeve comprising an internal surface defining a through bore extending along a central longitudinal axis of the second guide sleeve from a coronal end of the second guide sleeve to an apical end of the second guide sleeve, the apical end of the second guide sleeve comprising a radially extending, apically facing end surface, the internal surface of the second guide sleeve comprising an anti-rotation section having a non-circular cross-section in a plane perpendicular to the central longitudinal axis of the second guide sleeve,
the anti-rotation section of the hollow tube being complementary to the anti-rotation section of the guide sleeve, such that when the anti-rotation section of the hollow tube is inserted into the anti-rotation section of the guide sleeve, the hollow tube is rotationally fixed relative to the guide sleeve, and
the at least one radially extending first protrusion of the hollow tube being dimensioned for engagement with one of the radially extending, apically facing end surface of the second guide sleeve and the at least one undercut of the first guide sleeve, such that when the at least one radially extending first protrusion of the hollow tube is located apical of said radially extending, apically facing end surface or housed in said at least one undercut, the hollow tube is axially retained within the guide sleeve against movement in a coronal direction towards the coronal end of the guide sleeve.

17. A guide sleeve comprising:
- an internal surface defining a through bore extending along a central longitudinal axis from a coronal end of the guide sleeve to an apical end of the guide sleeve, the internal surface of the guide sleeve comprising:
  - an anti-rotation section comprising a plurality of radially extending grooves limited in a circumferential extent and spaced about the central longitudinal axis of the guide sleeve, and
  - at least one undercut formed by an increase in a radius of the through bore in an apical direction towards the apical end, the at least one undercut being at a location apical of a coronal end of the anti-rotation section, a radius of said at least one undercut being greater than a minimum radius of the anti-rotation section, and less than a radius of an outer surface of the guide sleeve at a location of the at least one undercut.

18. The guide sleeve as claimed in claim 17, wherein
- the plurality of radially extending grooves are evenly spaced about the central longitudinal axis, and
- the plurality of radially extending grooves are identical.

19. The guide sleeve as claimed in claim 17, wherein the anti-rotation section of the guide sleeve extends from the coronal end to the apical end of the guide sleeve, the at least one undercut of the guide sleeve being formed in the anti-rotation section at a location apical of the coronal end of the anti-rotation section, the radius of the at least one undercut being greater than the minimum radius but less than a maximum radius of the anti-rotation section of the guide sleeve.

20. The guide sleeve as claimed in claim 19, wherein the at least one undercut is a plurality of undercuts that are circumferentially spaced, each undercut of the plurality of undercuts having a radius less than the maximum radius and greater than the minimum radius of the anti-rotation section of the guide sleeve, the plurality of undercuts being dimensioned such that, at the location of the plurality of undercuts, all areas of the anti-rotation section having a radius less than the radius of the plurality of undercuts are removed, the plurality of undercuts being interposed by areas of anti-rotation section having a greater radius than the plurality of undercuts.

21. The guide sleeve according to claim 17, wherein the at least one undercut is formed in a wall of the guide sleeve on a radially inner side, and the at least one undercut does not penetrate entirely through the wall of the guide sleeve.

* * * * *